US009928817B2

(12) United States Patent
Little et al.

(10) Patent No.: US 9,928,817 B2
(45) Date of Patent: Mar. 27, 2018

(54) USER INTERFACES FOR VIRTUAL INSTRUMENTS

(71) Applicant: Apple Inc., Cupertino, CA (US)

(72) Inventors: Alexander H. Little, Woodside, CA (US); Joshua W. Decker, San Francisco, CA (US); Eli T. Manjarrez, Sunnyvale, CA (US); Christopher C. Lane, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/585,478

(22) Filed: May 3, 2017

(65) Prior Publication Data

US 2017/0330539 A1 Nov. 16, 2017

Related U.S. Application Data

(60) Provisional application No. 62/337,326, filed on May 16, 2016.

(51) Int. Cl.
*G09B 15/00* (2006.01)
*G09B 15/02* (2006.01)
(Continued)

(52) U.S. Cl.
CPC ......... *G10H 1/0008* (2013.01); *G06F 3/0482* (2013.01); *G06F 3/0488* (2013.01);
(Continued)

(58) Field of Classification Search
CPC ....... H04N 21/42224; H04N 2005/443; G10H 2220/096; G10H 2220/241; G10H 1/342; G10H 2210/201; G10G 1/00; G10G 1/02
See application file for complete search history.

(56) References Cited

U.S. PATENT DOCUMENTS 5,440,071 A 8/1995 Johnson
5,852,252 A 12/1998 Takano
(Continued)

FOREIGN PATENT DOCUMENTS

EP 2045796 4/2009
EP 2166438 3/2010
WO 2013134441 3/2014

OTHER PUBLICATIONS

"Direct Note Access", Product information Celemony Software GmbH, 2012, 2 pages.
(Continued)

*Primary Examiner* — Marlon Fletcher
(74) *Attorney, Agent, or Firm* — Kilparick Townsend & Stockton LLP

(57) ABSTRACT

Embodiments of the present disclosure can provide systems, methods, and computer-readable medium for implementing user interfaces for interacting with a virtual instrument. For example, first touch input indicating a string location of a plurality of string locations within the note selection area. Audio output corresponding to the sting location may be presented on a speaker based at least in part on the first touch input. Second touch input corresponding to an ornamental interface element of the user interface may be received. In response to the first and second touch input, a series of two or more audio outputs may be presented on the speaker according to a predetermined pattern.

40 Claims, 12 Drawing Sheets

(51) Int. Cl.
*G10H 1/00* (2006.01)
*G06F 3/0482* (2013.01)
*G06F 3/0488* (2013.01)
*G10H 7/00* (2006.01)

(52) U.S. Cl.
CPC .......... *G10H 1/0066* (2013.01); *G10H 7/002* (2013.01); *G10H 2210/225* (2013.01); *G10H 2210/381* (2013.01); *G10H 2220/096* (2013.01); *G10H 2220/106* (2013.01); *G10H 2230/075* (2013.01)

(56) References Cited

U.S. PATENT DOCUMENTS

| | | | |
|---|---|---|---|
| 5,890,116 A | 3/1999 | Itoh et al. | |
| 5,905,223 A | 5/1999 | Goldstein | |
| 6,111,179 A | 8/2000 | Miller | |
| 6,188,008 B1 | 2/2001 | Fukata | |
| 6,898,729 B2 | 5/2005 | Virolainen et al. | |
| 6,915,488 B2 | 7/2005 | Omori et al. | |
| 7,119,268 B2 | 10/2006 | Futamase et al. | |
| 7,273,979 B2 | 9/2007 | Christensen | |
| 7,754,955 B2 | 7/2010 | Egan et al. | |
| 7,985,917 B2 | 7/2011 | Morris et al. | |
| 8,362,347 B1* | 1/2013 | Scharfeld | G09B 15/023 84/470 R |
| 8,426,716 B2 | 4/2013 | Little et al. | |
| 8,539,368 B2 | 9/2013 | Nam et al. | |
| 8,751,971 B2 | 6/2014 | Fleizach | |
| 8,847,053 B2* | 9/2014 | Humphrey | G09B 5/065 434/308 |
| 8,937,237 B2 | 1/2015 | Little et al. | |
| 9,805,702 B1 | 10/2017 | Lane et al. | |
| 2002/0144587 A1 | 10/2002 | Naples et al. | |
| 2004/0154460 A1 | 8/2004 | Virolainen et al. | |
| 2004/0159219 A1 | 8/2004 | Holm et al. | |
| 2007/0240559 A1 | 10/2007 | Hasebe | |
| 2008/0307945 A1 | 12/2008 | Gatzsche et al. | |
| 2009/0102817 A1 | 4/2009 | Bathiche et al. | |
| 2010/0009749 A1* | 1/2010 | Chrzanowski, Jr. | A63F 13/10 463/35 |
| 2010/0137049 A1* | 6/2010 | Epstein | A63F 13/10 463/7 |
| 2010/0287471 A1* | 11/2010 | Nam | G06F 3/011 715/702 |
| 2011/0100198 A1 | 5/2011 | Gatzsche et al. | |
| 2011/0146477 A1 | 6/2011 | Tsukamoto | |
| 2011/0191674 A1 | 8/2011 | Rawley et al. | |
| 2011/0207513 A1* | 8/2011 | Cross | G10H 1/368 463/7 |
| 2011/0234503 A1 | 9/2011 | Fitzmaurice et al. | |
| 2011/0316793 A1 | 12/2011 | Fushiki et al. | |
| 2012/0151344 A1* | 6/2012 | Humphrey | G09B 5/065 715/716 |
| 2012/0160079 A1 | 6/2012 | Little et al. | |
| 2012/0174735 A1 | 7/2012 | Little et al. | |
| 2012/0174736 A1* | 7/2012 | Wang | G10H 1/0008 84/622 |
| 2012/0311508 A1* | 12/2012 | Fleizach | G06F 3/0488 715/863 |
| 2013/0180385 A1* | 7/2013 | Hamilton | G10H 1/0016 84/603 |
| 2013/0283159 A1 | 10/2013 | Nam et al. | |
| 2014/0083279 A1 | 3/2014 | Little et al. | |
| 2014/0083280 A1 | 3/2014 | Little et al. | |
| 2014/0137721 A1 | 5/2014 | Little et al. | |
| 2014/0349761 A1* | 11/2014 | Kruge | A63F 13/814 463/35 |
| 2015/0027297 A1* | 1/2015 | Avitabile | G09B 15/003 84/470 R |

OTHER PUBLICATIONS

Little, "Erhu Specification", Mahjong, Part of Stratego, v1.1, Feb. 10, 2016, 11 pages.
Little, "Erhu Touch Instrument Specification", Mahjong, Part of Stratego, v1.2, Feb. 15, 2016, 11 pages.
Little, "Pipa Touch Instrument Specification", Mahjong, Part of Stratego, v1.1, Mar. 3, 2016, 9 pages.

* cited by examiner

USER INTERFACES FOR VIRTUAL INSTRUMENTS

CROSS-REFERENCES TO RELATED APPLICATIONS

This application claims the benefit of U.S. Provisional Application No. 62/337,326, filed May 16, 2016, the disclosure of which is incorporated herein by reference.

This application is related to U.S. Provisional Application No. 61/607,585 filed Mar. 6, 2012, which is herein incorporated by reference for all purposes.

The present disclosure relates to U.S. Non-provisional application Ser. No. 15/273,909 filed Sep. 23, 2016 entitled "SEPARATE ISOLATED AND RESONANCE SAMPLES FOR A VIRTUAL INSTRUMENT," the entire contents of which is herein incorporated by reference for all purposes.

BACKGROUND

Virtual musical instruments, such as musical instrument digital interface (MIDI)-based or software-based keyboards, guitars, bass instruments, and the like, typically have user interfaces that attempt to closely resemble the actual instrument. When a user selects an element of the user interface, the virtual musical instrument attempts to play a note, a combination of notes, chord(s), etc., to simulate playing the actual instrument. While these instruments are enjoyable to amateur and experienced musicians alike, they may not be satisfactory to users hoping for a more authentic experience. For example, some physical instruments and/or musical genres may be associated with certain stylistic features such as a particular playing style, picking technique, embellishments, and the like. These stylistic features may be difficult or impossible for a user to emulate with conventional user interfaces. This can be problematic for users who would like to include such stylistic features as they play. Additionally, some users may be inexperienced with the actual instrument or may find an interface that closely resembles the playing surface of the actual interface difficult or confusing to utilize.

SUMMARY

Embodiments of the present disclosure can provide systems, methods, and computer-readable medium for implementing user interfaces for interacting with a virtual instrument. In some examples, a computing device (e.g., a mobile phone or other portable, handheld device) may be used to present user interfaces that enable the application of variations and/or ornamental features during audio output.

In some embodiments, a computer-implemented method for implementing a variation control interface element may be provided. The method may include obtaining a plurality of audio samples corresponding to recordings of musical notes played by a physical instrument. A user interface associated with the physical instrument may be displayed on a display screen of an electronic device. In some examples, the user interface may comprise a strum area, a variation control interface element, and a fret selection area that comprises a plurality of fret positions. First touch input may be received at the user interface of the electronic device, the first touch input indicating a fret position of a plurality of fret positions within the fret selection area. An audio sample of the plurality of audio samples may be presented via a speaker of the electronic device based at least in part on the first touch input. In some examples, the audio sample may comprise a note corresponding to the fret position. Second touch input may be received at the user interface, the second touch input corresponding to a location within the variation control interface element. In some embodiments, the second touch input may be received while the first touch input is being received. A speed at which to play the audio sample repeatedly may be determined based at least in part on the second touch input. The audio sample may be repeatedly presented via a speaker of the electronic device based at least in part on the determined speed.

In some embodiments, a system for implementing a variation control interface element may be provided. The system may comprise a memory configured to store computer-executable instructions, a display screen, a speaker, and a processor in communication with the memory and the speaker. The processor may be configured to execute the computer-executable instructions to perform operations. The operations may include displaying a user interface for a virtual instrument on the display screen, the user interface comprising a variation control interface element and a fret selection area that comprises a plurality of fret positions. The operations may further include receiving, at the user interface, first touch input indicating a fret position of the plurality of fret positions within the fret selection area. The operations may further include presenting, via the speaker, audio output based at least in part on the first touch input, the audio output comprising a note corresponding to the fret position. The operations may further include receiving, at the user interface of the electronic device, second touch input corresponding to the variation control interface element while the first touch input is being received. The operations may further include presenting, via the speaker, additional audio output that comprises a plurality of repeated notes based at least in part on the fret position and the second touch input corresponding to the variation control interface element.

In some embodiments, a computer-readable medium may be provided. The computer-readable medium may include computer-executable instructions that, when executed by a processor, cause the processor to perform operations. The operations may include displaying, on a display screen, a user interface for a virtual instrument associated with a physical instrument, the user interface comprising a plurality of note selection areas and a variation control interface element, the plurality of note selection areas being grouped into sets of note selection areas associated with a corresponding musical scale. The operations may further include receiving, at the user interface, a first touch input indicating selection of a note selection area of a set of note selection areas corresponding to a particular musical scale. The operations may further include determining an audio sample of a plurality of audio samples based at least in part on the first touch input indicating selection of the note selection option. The operations may further include presenting, via a speaker, audio output corresponding to the audio sample. The operations may further include receiving, at the user interface, a second touch input corresponding to a location within the variation control interface element. The operations may further include determining a speed at which to present additional audio output based at least in part on the second touch input. The operations may further include presenting, via the speaker, the additional audio output that comprises a plurality of repeated notes based at least in part on the note selection area and the determined speed.

In some embodiments, a computer-implemented method for implementing an ornamental interface element may be provided. The method may include displaying, on a display screen of an electronic device, a user interface for a virtual instrument, the user interface comprising a plurality of string locations and a plurality of ornamental interface elements. The method may further include receiving, at the user interface of the electronic device, first touch input indicating a string location of the plurality of string locations within the note selection area. The method may further include presenting, via a speaker of the electronic device, audio output based at least in part on the first touch input, the audio output comprising a note corresponding to the string location. The method may further include receiving, at the user interface of the electronic device, second touch input corresponding to an ornamental interface element of the plurality of ornamental interface elements. The method may further include presenting, via the speaker of the electronic device, a series of two or more audio outputs based at least in part on the audio output and the second touch input corresponding to the ornamental interface element, the series of two or more audio outputs being presented according to a predetermined pattern.

In some embodiments, a system for implementing a variation control interface element may be provided. The system may comprise a memory configured to store computer-executable instructions, a display screen, a speaker, and a processor in communication with the memory and the speaker. The processor may be configured to execute the computer-executable instructions to perform operations. The operations may include displaying, on the display screen, a user interface for a virtual instrument, the user interface comprising a plurality of string locations within a note selection area and a plurality of ornamental interface elements comprising at least a vibrato control interface element. The operations may further include receiving, at the user interface, first touch input indicating a string location of the plurality of string locations within a note selection area. The operations may further include presenting, via the speaker, audio output based at least in part on the first touch input, the audio output comprising a note corresponding to the string location. The operations may further include receiving, at the user interface, second touch input corresponding to selection of the vibrato control interface element. The operations may further include modifying the audio output based at least in part on the second touch input corresponding to the vibrato control interface element, the modified audio output and the audio output differing at least by pitch. The operations may further include presenting, via the speaker, the audio output and the modified audio output.

In some embodiments, a computer-readable medium may be provided. The computer-readable medium may include computer-executable instructions that, when executed by a processor, cause the processor to perform operations. The operations may include obtaining a plurality of audio samples corresponding to recordings of musical notes played by an instrument. The operation may further include displaying, on a display screen of an electronic device, a user interface for a virtual instrument associated with a physical instrument, the user interface comprising a plurality of note selection areas and vibrato control interface element, the plurality of note selection areas being grouped into sets of note selection areas individually associated with a corresponding musical scale. The operation may further include receiving, at the user interface, a first touch input indicating selection of a note selection area of a set of note selection areas associated with a particular musical scale. The operation may further include determining an audio output from the plurality of audio samples based at least in part on the first touch input indicating selection of the note selection option. The operation may further include presenting, via a speaker, the audio output according to the first touch input. The operation may further include receiving, at the user interface, a second touch input corresponding to the vibrato control interface element. The operation may further include modifying the pitch of the audio output based at least in part on the second touch input corresponding to the vibrato control interface element.

The following detailed description together with the accompanying drawings will provide a better understanding of the nature and advantages of the present disclosure.

DETAILED DESCRIPTION

Figure 1:
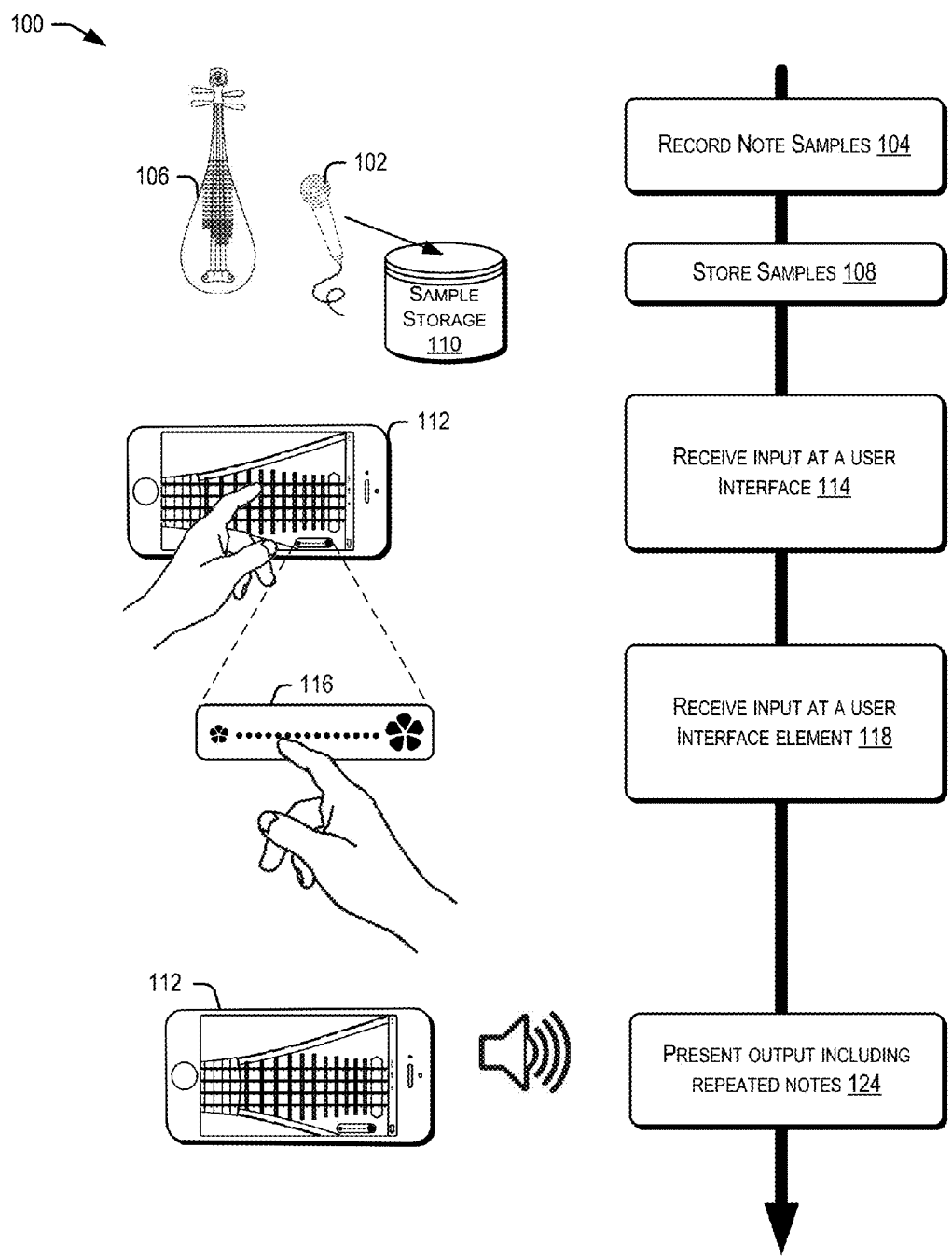
FIG. 1 is a simplified block diagram illustrating an example flow for providing audio output for a virtual instrument (e.g., a pipa) as described herein, according to at least one example.

Certain embodiments of the present disclosure relate to devices, computer-readable medium, user interfaces, and methods for implementing a user interface for interacting with a virtual instrument. Examples are described with reference to virtual instruments, and user interfaces of the virtual instruments for playing notes and/or music (e.g., electronic audio files) with the virtual instruments. The virtual instruments may be generally designed to give the look and feel of an actual instrument, and may be intended to sound like the actual instrument. Virtual instruments can be designed to mimic nearly any musical instrument, with examples including, but not limited to, string instruments, horns, woodwinds, various keyboards, and the like. Although examples herein may utilize particular stringed instruments, the same examples may be similarly applied to other types of musical instruments. A computing device (e.g., a mobile phone, tablet, or other portable, handheld device, or a desktop computer, laptop, etc.) may be configured to present various user interfaces and corresponding interface elements that enable the simulations of variations and/or ornamental features to audio output produced for the virtual instrument. An interface element and/or various selection areas discussed herein may include a portion of the user interface (e.g., a button, a slider, an option, an area, a checkbox, and the like) that enables a particular functionality when the interface element/selection area is utilized.

By way of example, the computing device may provide a user interface that may include an interface element (e.g., a variation control interface element) that enables the user to change and control the simulated picking technique used for the audio output presented. As a non-limiting example, the computing device may be configured to present a user interface that closely resembles a string instrument that is associated with a type of playing style. For example, many string instruments of the Eastern world (e.g., a pipa) are associated with particular picking techniques (e.g., a lunzhi picking technique). Additionally, or alternatively, a picking technique or ornamental feature may be associated with a particular musical style (e.g., baroque-period music, classical music, jazz, rock, etc.). The user interface may be presented on a display of the computing device to enable the user to control the simulated picking technique used for the audio output presented. Some example picking techniques will be discussed in more detail in the figures to follow.

In some embodiments, a user interface may include a number of interface elements (e.g., ornamental control interface elements) for controlling the application of ornamental features (e.g., grace notes, trills, mordents, horse effect, vibrato, etc.) to the audio output presented. A grace note is generally considered to refer to an extra note that immediately precedes another note to provide an embellishment that is not essential to the harmony or melody. A trill refers to a rapid alternation of two or more notes. A mordent refers to a rapid alternation between two notes that starts on the original notes, shifts to another note, and then returns to the original note. A horse effect may be associated with a series of notes played on a stringed instrument that generally resemble a whinny of a horse. Vibrato generally refers to a rapid, slight variation in pitch on a musical instrument that produces a stronger or richer tone. Utilizing such interface elements to interject these ornamental features within audio output may produce sounds that more accurately simulate traditional playing techniques of the physical instrument and/or a musical style than audio output played by traditional virtual instruments.

In at least one embodiment, a user interface of the virutal instrument may include an interface element (e.g., a scale seletion option) that may enable customization of the musical scale with which the virtual instrument will be configured. A musical scale may be any set of musical notes that are ordered by fundamental frequency or pitch. Musical scales are often octatonic (8 notes per octave), heptatonic (7 notes per octave), hexatonic (6 notes per octave), pentatonic (5 notes per octave), tentratonic (4 notes per octave), or monotonic (1 note per octave), although any suitable number of notes per octave may be utilized herein. For example, the user interface may enable the user to select a number of musical scales options including, but not limited to, a major scale, a major pentatonic, a major blues scale, a mixolydian scale, a klezmer scale, a minor pentatonic, a minor blues scale, a Japanese scale, a minor scale, a harmonic minor scale, a dorian scale, and a south-east Asian scale, to name a few. Each scale may correspond to different sets of musical notes that are playable by the virtual instrument. Upon selecting a type of musical scale via the provided interface element, the virtual instrument interface may be configured to associate particular locations (e.g., fret positions on a stringed virtual instrument, string locations on unfretted musical instruments, key holes on a woodwind virtual instrument, etc.) with particular notes of the selected musical scale. Accordingly, by utilizing the provided interface element (e.g., the scale selection option), the "key" or "scale" of the virtual instrument may be changed to match the mode, style, mood, or key desired.

In some examples, a user interface may provide the ability to simulate a pitch bend with the audio output being presented. For example, the user interface may enable the user to select and drag a string to visually bend the string upward or downward. The dragging action may produce one or more pitch bend requests that individually indicate, among other things, the original note and/or the corresponding fret position/string location, a distance that the string has been dragged or an angle of the bent string. In response to a pitch bend request, the computing device may be configured to modify and/or select an audio sample of a bent note corresponding to the note selected. Alternatively, the audio sample may be manipulated to correspond to the bent note required. That is, an audio sample may be modulated to a higher or lower pitch according to the pitch bend request. In either case, the audio output may provide a note that is bent to a higher or lower pitch depending on the direction, speed, and/or distance the string is dragged.

In some embodiments, the computing device may be configured to provide a chords view and a key view of the user interface for the virtual instrument. In key view, the user interface of the virtual instrument may be depicted as being visually similar to the real instrument. For example, for a string instrument in key view, the computing device may be configured to provide a playing interface that includes a neck, frets, and a strum area, or any suitable combination of the above. In chords view, the user interface may be depicted with multiple note selection areas that are grouped in sets that are associated with a corresponding musical scale. In chords view, any note selected within a group may belong to a common musical scale. In at least one example, the chords view may provide fewer visual elements within the playing interface than the visual elements provided in the key view.

In accordance with at least one embodiment, the user interface may include an auto-play selection interface element (e.g., a knob, a radio button, check box, or other suitable selection interface element) for one or more auto-play options. The auto-play selection interface element may be utilized to select an auto-play option. When a note is selected at the user interface, the computing device may be configured to select and present one of a myriad of musical arrangements. By way of example, the auto-play options may be depicted as a knob that includes numbered options (e.g., "off", 1, 2, 3, 4, etc.). The knob may be rotated clockwise or counter-clockwise. In some examples, the auto-play options may correspond to a set of predetermined musical arrangements. The set of arrangements may be curated from well-known musical arrangements that are typically associated with the physical instrument. The computing device may be configured to select the musical arrangement from a library of predetermined arrangements and present the selected arrangement on a speaker associated with the computing device.

The computing device may include accelerometer(s) and/or gyroscopes or any suitable component for producing motion data. Such data may be utilized to determine a motion of the device such as a tilt angle, tilt direction, and/or tilt speed of the computing device. In some examples, the motion data may be used as input and associated with any of the interfaces/interface elements discussed herein. As a non-limiting example, a pitch bend request may be initiated by touch/drag or by a tilt action. Similarly, a vibrato may be simulated with the audio output based on touch/drag or by a tilt action of the device. Additionally, or alternatively, the computing device may include a touch interface that may be utilized in conjunction with any of the interfaces/interface elements discussed herein. For example, a simulated vibrato may be deepened or lessened according to how much pressure is applied at the touch interface. In some examples, the vibrato may become more noticeable as the touch pressure is increased and less noticeable as the touch pressure is decreased. As another example, a simulated trill may be sped up with increased pressure and slowed down with a decrease of pressure. Additional examples of tilt and touch inputs may be provided in the description of the following figures.

FIG. 1 is a simplified block diagram illustrating an example flow 100 for providing audio output for a virtual instrument (e.g., a pipa) as described herein, according to at least one example. A "Pipa" is a traditional Chinese instrument. The pipa has four strings that may be tuned low-to-high with the notes A-D-E-A, and that may be played with finger picks. The plucking is 'pi' outward and 'pa' inward. String bends are also a common technique for the left hand. For the picking hand a tremolo technique called "lunzhi" is very common and an important characteristic playing style for the pipa. The lunzhi is a rapid succession of the plucking of two to five fingers on a common string. There is also a characteristic rapid raking/strumming of all four strings in both directions called the "sao" and the "fu."

In some examples, recording device 102 (e.g., a computing system with a microphone or the like) may be configured to record audio samples (e.g., note samples) at 104. The audio samples may be a recording of sound that is made when a string of physical instrument 106 (e.g., a pipa) is affected in some way. For example, a user may strum, pluck, hammer, pull, draw with a bow, fingernail, or other item, etc., of the physical instrument 106 to make the sound. Recording device 102 may be configured to record the note that was played by the string.

Once recorded, the samples may be stored at 108 in sample storage 110. Sample storage 108 can be any type of memory or storage device including, but not limited to, any type of non-volatile memory that can be used to store the isolated samples in a permanent or at least semi-permanent fashion. Sample storage 108 can be memory that is local to recording device 102, the computing system that includes recording device 102, or user device 112 (e.g., a cellular telephone, tablet, laptop, or the like). As such, the samples may be stored at user device 112 as soon as they are created, or they may be need to be received by user device 112 and stored locally for later use. In any event, the audio samples can be stored for replay when a user selects an appropriate user interface element, as will be described in further detail.

In some examples, a user may activate and/or utilize a user interface displayed on user device 112 to play the virtual instrument. In one example, a neck of a stringed instrument (e.g., a pipa) may be presented by the user interface in such as a way as to represent the frets of the neck of physical instrument 106. As such, at 114, user device 112 may receive input (e.g., touch input) at the user interface of the virtual instrument via an application presented by user device 112. The input may be an indication of two different things: the note that the user would like to play (e.g., identified based on a location of touch input at the user interface) and the manner with which the user would like the note played.

At 118, input may be received that relates to user interactions with a user interface element 116 (e.g., a variation control interface element). The input from user interface element 116 (e.g., touch input) may indicate a speed and/or volume at which a note may be repeatedly played to simulate a particular picking pattern. In some embodiments, input (e.g., touch input) received at the user interface element 116 may be utilized to modify presented audio output to include a simulated picking technique. The user interface element 116 may include a control slider that enables the user to control the speed of the simulated picking. By way of example, the user interface element 116 may be used to modify the audio output to include a number of repeated notes that may be sounded on the physical instrument 106 if the player was utilizing a lunzhi picking technique. A lunzhi picking technique may include two to five fingers (including the thumb) that are used to repeatedly sound a single note.

At 124, audio output corresponding to the input received at 114 and 118 may be presented by a speaker or other output device of user device 112. As a non-limiting example, once a note is selected (e.g., input received at 114), the user may increase or decrease the speed of the repeated notes by sliding his finger along the user interface element 116. In some embodiments, the left-most point of the user interface element 116 may correspond to a minimum picking speed, while the right-most point may correspond to a maximum picking speed. The audio output of the note may be modified and presented at 124 according to the selected location of the user interface element 116. Accordingly, if the user first selects the left-most location within the user interface element 116, a relatively slow picking may be simulated with the audio output. As the user slides his finger toward the right-most point of the user interface element 116, the picking speed may be increased to a picking speed corresponding to the location selected. Additionally, or alternatively, the speed of the simulated picking may be increased or decreased by touch. Accordingly, the user may lightly touch the user interface element 116 to cause slow simulated picking. By increasing the pressure of his touch on the user interface element 116, the speed of the simulated picking may be increased.

Additionally, the volume or attack of the simulated picking may be modified by touch. By way of example, the user may select a location within the user interface element 116 to cause simulated repetitive picking to commence. The user may then increase touch pressure at the string/fret location and/or at the user interface element 116 to increase the volume and/or attack of the simulated picking. Similarly, the user may decrease touch pressure at either location to decrease the volume and/or attack of the simulated picking. In some examples, when input (e.g., touch input) is no longer being received from the user interface element 116, the audio output may revert to playing the note selected without any simulated picking.

Figure 2:
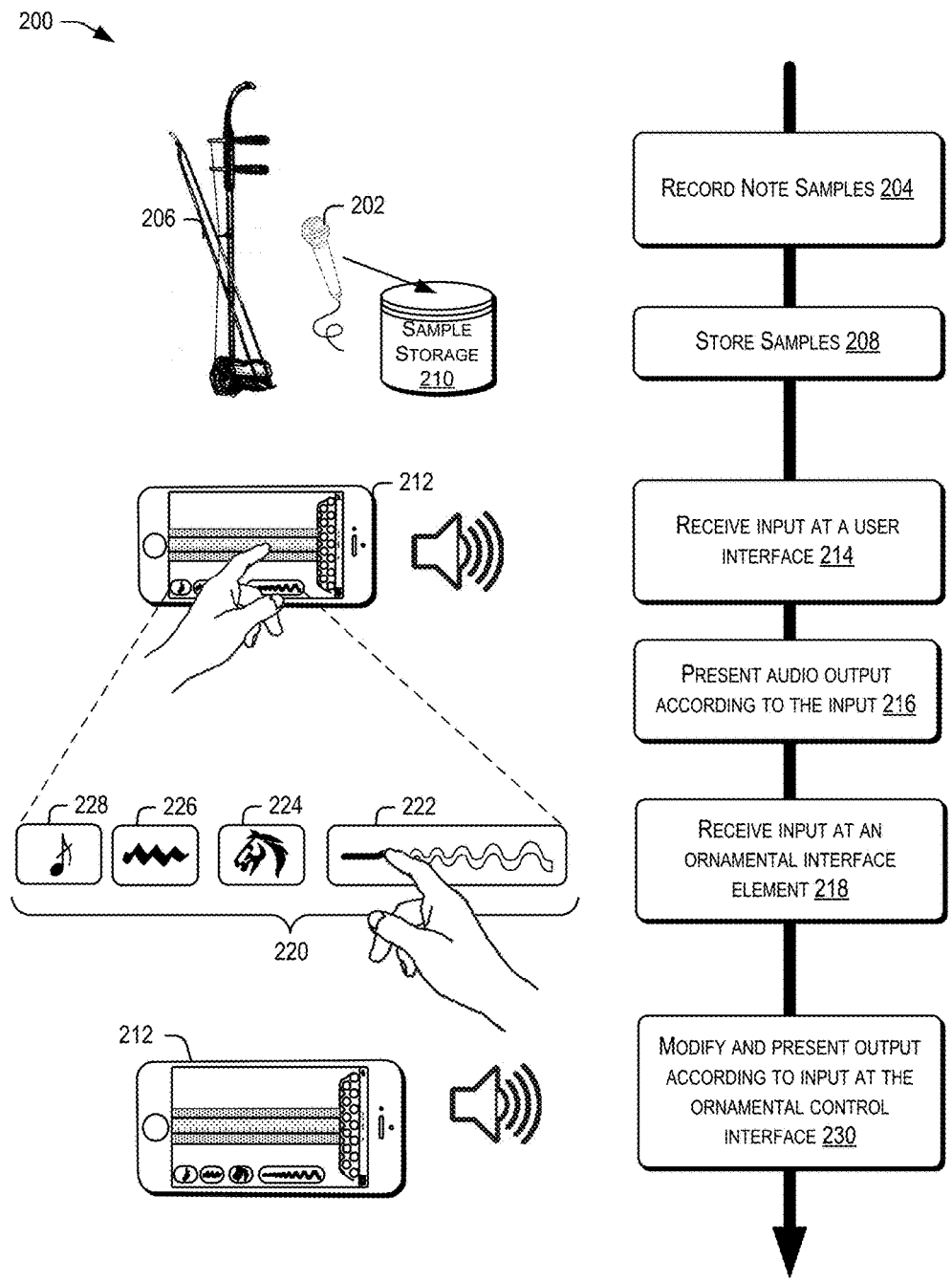
FIG. 2 is a simplified block diagram illustrating an example flow for providing audio output for a virtual instrument (e.g., an erhu) as described herein, according to at least one example.

FIG. 2 is a simplified block diagram illustrating an example flow 200 for providing audio output for a virtual instrument (e.g., an erhu) as described herein, according to at least one example. An "Erhu" is a traditional Chinese instrument. The erhu has two strings and is played with a bow. It is known for very expressive playing styles and is often considered a sorrowful instrument. Typical traditional playing styles feature many deep vibrato, glissandi, pull-offs, hammer-ons, wide dynamic range, and characteristic ornaments like trill, grace notes, and mordents. The instrument is also known for a characteristic "Horse effect" which is played using upper glissando harmonics and deep vibrato.

Similar to the example of FIG. 1, a recording device 202 (e.g., a computing system with a microphone or the like) may be configured to record audio samples (e.g., note samples) at 204. The audio samples may be a recording of sound that is made when a string of physical instrument 106 (e.g., an erhu) is affected in some way. For example, a user may pluck, hammer, pull, draw with a bow, fingernail, or other item, etc., of the physical instrument 206 to make the sound. Recording device 202 may be configured to record the note that was played by the string.

Once recorded, the samples may be stored at 208 in sample storage 210. Sample storage 210 can be any type of memory or storage device including, but not limited to, any type of non-volatile memory that can be used to store the isolated samples in a permanent or at least semi-permanent fashion. Sample storage 210 can be memory that is local to recording device 202, the computing system that includes recording device 202, or user device 212 (e.g., a cellular telephone, tablet, laptop, or the like). As such, the samples may be stored at user device 212 as soon as they are created, or they may be need to be received by user device 212 and stored locally for later use. In any event, the audio samples can be stored for replay when a user selects an appropriate user interface element, as will be described in further detail.

In some examples, a user may activate and/or utilize a user interface of user device 212 to play the virtual instrument. In one example, a neck of a stringed instrument (e.g., an erhu) may be presented by the user interface in such as a way as to represent the neck of the physical instrument 206. At 214, user device 212 may receive input (e.g., touch input) at the user interface of a virtual instrument via an application presented by user device 212. The input may be an indication of two different things: the note that the user would like to play (e.g., identified based on a location of touch input at the user interface) and the manner with which the user would like the note played. At 216, audio output may be presented according to the input provided at 214. By way of example, the audio output may correspond to a note selected from the user interface of user device 212.

Further input (e.g., touch input) may be provided at 218, in relation to user interactions with ornamental interface elements 220. Ornamental interface elements 220 may include a vibrato control interface element 222, a horse-effect selection interface element 224, a trill control interface element 226, a grace-note control interface element 228, or any suitable combination of the above. The input from these interface elements may indicate a manner in which to modulate the pitch of the audio output presented or a manner in which to provide a series of two or more notes according to a predetermined pattern.

By way of example, a user may provide further input (e.g., touch input) at 218 utilizing the vibrato control interface element 222 in order to modify the audio output to include simulated vibrato. The vibrato control interface element 222 may include a control slider that enables the user to control the speed/depth of the simulated vibrato. By way of example, the vibrato control interface element 222 may be used to modify the pitch of the audio output as if the physical instrument 206 was being played with a vibrato technique. The input provided at the vibrato control interface element 222 may cause the audio output to oscillate between a pitch of the originally sounded note, to a slightly higher pitched note.

As a non-limiting example, once a note is selected (e.g., touch input received at 214) and corresponding audio output presented at 216, the user may select a location within the vibrato control interface element 222 to increase or decrease the speed/depth of the repeated notes by sliding his finger along the vibrato control interface element 222. In some embodiments, the left-most point of the vibrato control interface element 222 may correspond to a minimum vibrato speed, while the right-most point may correspond to a maximum vibrato speed. The pitch of the audio output provided may be modified and presented at 230 according to the selected location of the vibrato control interface element 222. Accordingly, if the user first selects the left-most location within the vibrato control interface element 222, a relatively slow vibrato may be simulated with the audio output. As the user slides his finger toward the right-most point of the vibrato control interface element 222, the speed of the vibrato may be increased to a vibrato speed that corresponds to the location selected. Additionally, or alternatively, the speed of the simulated vibrato may be increased or decreased by touch. Accordingly, the user may lightly touch the vibrato control interface element 222 to cause slow simulated vibrato. By increasing the pressure of his touch on the vibrato control interface element 222, the speed of the simulated vibrato may be increased.

Additionally, a default of the simulated vibrato may be modified at the vibrato control interface element 222. By way of example, the user may tap and/or hold within the vibrato control interface element 222 to set a default vibrato amount. Subsequent note selections may produce audio output that may be modified to include an amount of vibrato corresponding to the default selected. The user may additionally control the amount of simulated vibrato by touch. By way of example, the user may select and hold at a location within the vibrato control interface element 222. The amount of simulated vibrato may be determined by a touch pressure used at the selected location. The user may then increase touch pressure at the vibrato control interface element 222 to increase the speed/depth of the simulated vibrato. Similarly, the user may decrease touch pressure the vibrato control interface element 222 to decrease the speed/depth of the simulated vibrato. In a similar manner, touch input may be received at the string location corresponding to the note selected. Instead of utilizing the vibrato control interface element 222 directly, the user may increase or decrease pressure on the string to control the amount of simulated vibrato. In this case, a harder touch may still correspond to a greater amount of vibrato while a lighter touch may still correspond to a lesser amount of vibrato. In some examples, when input is no longer being received from the vibrato control interface element 222, the audio output may revert to playing the note selected without any simulated vibrato or the audio output may revert to playing the note selected with a default amount of vibrato.

As another non-limiting example, once a note is selected (e.g., touch input received at 214) and corresponding audio output presented at 216, the user may select a location on the horse-effect selection interface element 224 to modify the audio output to include a series of two or more notes according to a predetermined pattern. By way of example, a pattern for a horse-effect (e.g., a simulated horse whinny) that may indicate a series of glissandos between a number of notes. In some embodiments, selection of the horse-effect selection interface element 224 may cause a prerecorded horse-effect audio sample to be selected from any suitable number of such samples. A horse-effect audio sample may include a recording of a horse-effect as played on the physical instrument 206. In other embodiments, the horse-effect audio sample may be generated from, for example, the note selected and a predetermined pattern of notes. At 230, the audio output may be modified to include the horse-effect selected/generated from the input received at 218.

As yet another non-limiting example, once a note is selected (e.g., touch input received at 214) and corresponding audio output presented at 216, the user may select a location within the trill control interface element 226 to modify the audio output presented at 230 to include a series of two or more notes according to a predetermined pattern. By way of example, a pattern for a trill may indicate a rapid oscillation between the selected note and another note within a predetermined pitch/frequency distance of the selected note. In some examples, the trill note may be a half step or a whole step above the pitch/frequency of the selected note. The speed of the trill (e.g., the oscillation) may be increased or decreased by touch. For example, the user select the trill control interface element 226 to cause the audio output to oscillate between the selected note and the trill note. By increasing the pressure of his touch on the trill control interface element 226, the speed of the simulated trill may be increased. Similarly, by decreasing the pressure of his touch on the trill control interface element 226, the speed of the simulated trill may be decreased. In some examples, when input is no longer being received from the trill control interface element 226, the audio output may revert to playing the note selected without any simulated trill.

In still one further non-limiting example, once a note is selected (e.g., touch input received at 214) and corresponding audio output presented at 216, the user may select a location within the grace-note control interface element 228 to modify the audio output presented at 230 to include a grace note. In some examples, the grace note may be a half step or a whole step above or below the pitch/frequency of the selected note. Upon tapping the grace-note control interface element 228, the audio output presented at 230 may be modified to include the grace note, immediately followed by the originally selected note. The action may be repeated any suitable number of times, each selection causing the audio output to be modified with the insertion of a grace note.

Figure 3:
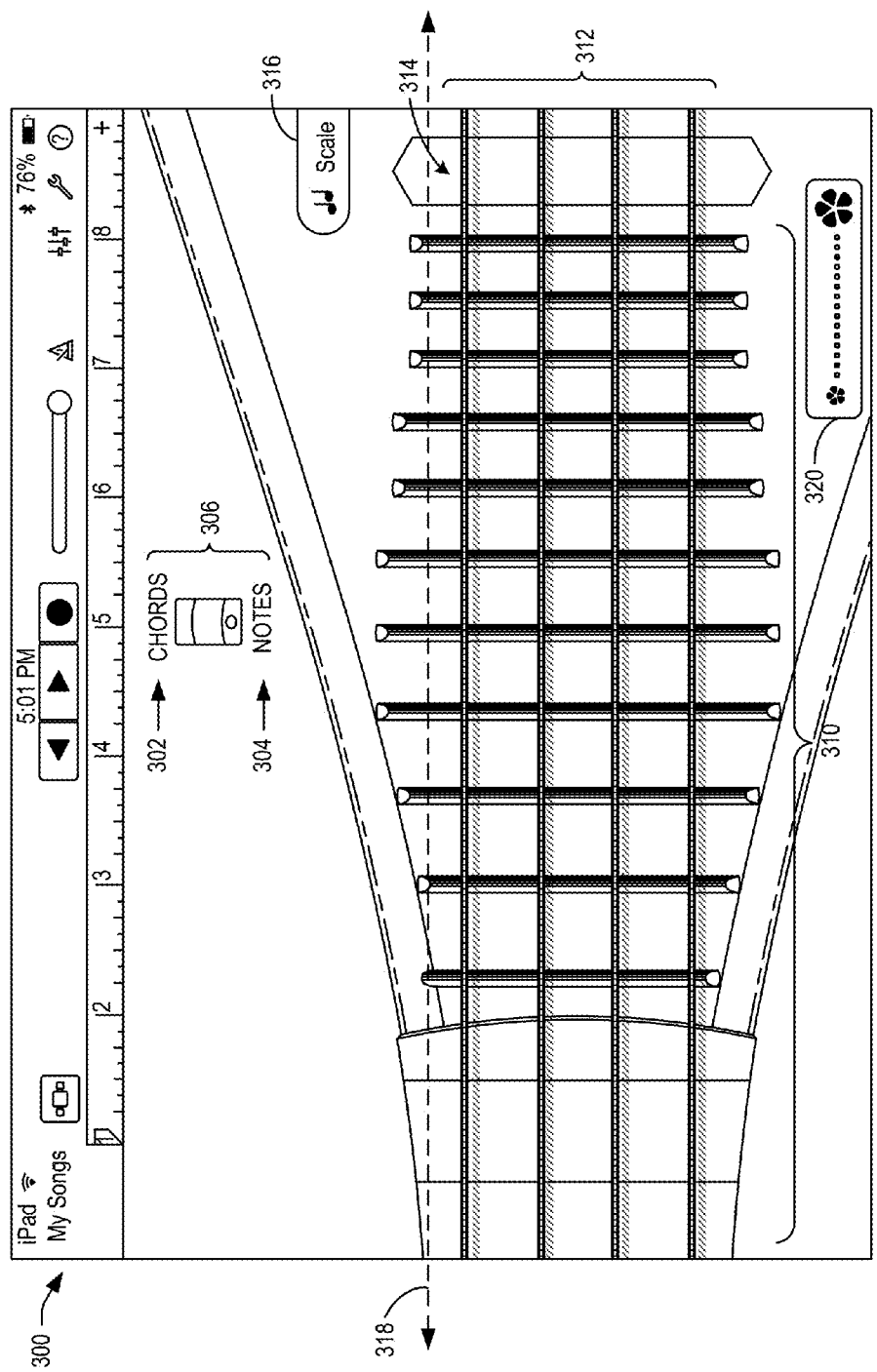
FIG. 3 is a simplified block diagram illustrating an example user interface for a virtual instrument (e.g., a pipa) that includes a variety of user interface elements, according to at least one example.

FIG. 3 is a simplified block diagram illustrating an example user interface 300 for a virtual instrument (e.g., a pipa) that includes a variety of user interface elements, according to at least one example. In some examples, the user interface 300 may have two main view options (e.g., "Notes" option 302 and "Chords" option 304). In some examples (e.g., on a mobile device), there will be a transitional element (view controller 306) which will allow the user to switch between Notes view and Chord view by selecting "notes" option 302 or "chords" option 304. View controller 306 may be displayed within the user interface 300 or the view controller 306 may be accessible via the user interface 300. In some embodiments, the "notes" option 302 and/or the "chords" option 304 may be labeled with other names (e.g., "chords" option 304 may be indicated with the word "harmony"). FIG. 3 is intended to illustrate variations of the notes view of the pipa while FIG. 5 will discuss the chords view in more detail.

Figure 4:
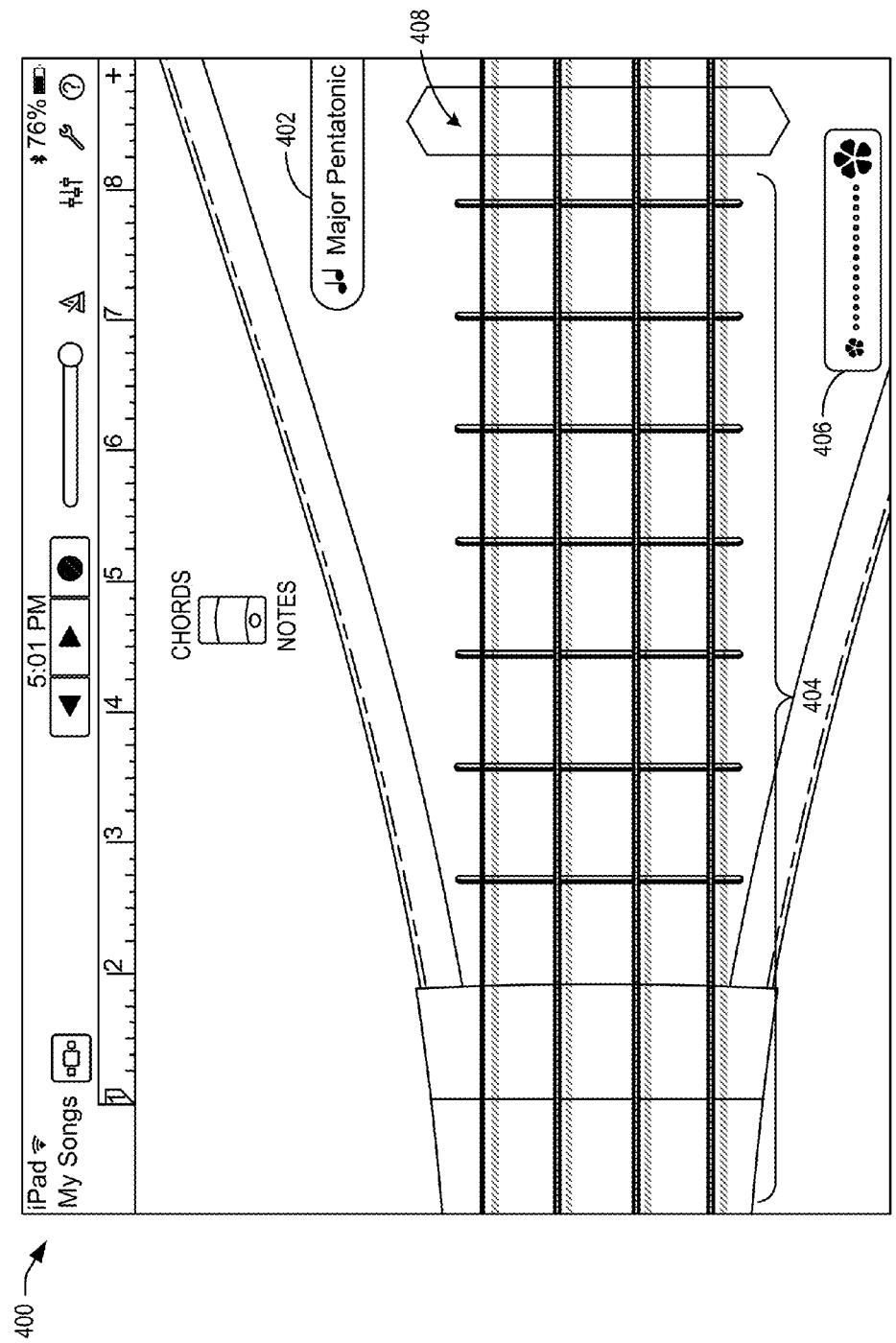
FIG. 4 is a simplified block diagram illustrating another example user interface for a virtual instrument (e.g., a pipa) that includes a variety of user interface elements, according to at least one example.

Within the notes view, the user may be enabled to interact with a version of the neck that is laid out chromatically with intervallic relationships that match the physical (e.g., real) instrument. For example, frets 310, strings 312 (e.g., four strings), and strum area 314 may be presented within the user interface 300 to emulate the look of the physical pipa instrument. In notes view, the user interface 300 may also feature a scale selection option 316, which may enable the user to switch to a fixed scale. For example, upon selecting the scale selection option 316, the user may be presented with a pop-up or other suitable menu from which a musical scale may be selected. Once a scale is selected (e.g., Major Pentatonic), frets 310 and/or fret selection areas between frets 310, may be associated with the musical scale selected. In some embodiments, the number of and/or distance between frets 310 may be modified according to the musical scale selected. FIG. 4, for example, depicts the fret selection area presented if the Major Pentatonic scale is selected via the scale selection option 316.

In some embodiments, the notes view may enable the user to play a note by selecting any point on the strings 312, singularly or in combination. Accordingly, up to four locations may be selected at a given time, each location corresponding to a separate string. For each location selected, an audio sample corresponding to the location may be presented via the speaker of the computing device. Upon selecting a string location, the string itself may brighten and/or appear to vibrate to give a visual indication that the audio output being presented corresponds to the string. Note volume may be based at least in part on an attack accelerometer value mapped to a MIDI velocity. Accordingly, a light tap may produce a quieter note, while a harder tap may produce a louder note.

The strings 312 may be configured to be dragged upward or downward at the location selected. The dragging motion may produce a pitch bend request indicating the location (e.g., the note/fret) and a distance dragged. In some embodiments, a pitch bend request may be initiated by selecting one of the frets 310 and tilting the device. Accordingly, the pitch bend request may include an angle and direction of tilt of the computing device. The distance dragged and/or the angle and direction of tilt may be used to determine a degree by which the note should be bent. In some examples, dragging upward may bend the note upward (e.g., raise the pitch/frequency) to an amount that is based on the distance dragged or angle of tilt. Similarly, dragging downward may bend the note downward (e.g., lower the pitch/frequency). However, in some examples, a bend upward or downward may perform the same type of bend (e.g., both may raise the pitch/frequency or both may lower the pitch/frequency). A threshold distance/angle may be predetermined that constrains the bend to a certain pitch difference from the pitch of the original note. In other words, the bend may occur proportional to the distance dragged until a threshold distance is met or exceeded, at which point a particular pitch difference (e.g., a whole step from the pitch of the original note, a half step from the pitch of the original note, etc.) may be maintained. Similarly, a bend may be performed until a threshold angle of tilt (e.g., 15 degrees) is exceeded, at which point the particular pitch difference may be maintained.

One characteristic playing style of the pipa is to pre-bend a note, pluck the note, then release the bend to the actual fretted note. In at least one embodiment, a tilt motion could be used as a way to achieve this type of playing technique. For example, if an angle of tilt has increased more than 15 degrees clockwise (with respect to an axis 318) past the angle of the device at the time the previous note was triggered, and new note may be triggered with upward bent pitch. If an angle of tilt has increase more than 15 degrees counter-clockwise (with respect to the axis 318) past the angle of the device at the time the previous note was triggered, and new note is triggered, then a new note may be triggered with a downward bent pitch. In other words, the computing device may be initially tilted (e.g., at 18 degrees past the angle of the device at the time a previous note was triggered). While, the device is tilted, a note may be selected from, for example, a fret selection area. Initially, based on the tilt angle and the note selected, a bent note (e.g., a note that is a whole step higher than the selected note) may be presented. As the device is returned to a neutral position (e.g., the angle of the device at the time the previous note was triggered) the notes pitch may be lowered proportionally to the pitch of the selected (e.g., fretted) note. In some embodiments, the device may be initially tilted when the note is selected and the bend return to the selected note pitch may be performed automatically without the device being returned to the neutral position.

In some embodiments, the user interface 300 may enable the user to perform a slide-to-adjacent-note playing technique that may sound much like a pre-bent note. For example, a user may select one of the frets 310. The user may then maintain contact with the device screen and slide his finger up or down the on the same string. As the finger slides up or down, the sounded note may bend up or down from the pitch of the selected note.

In some embodiments, the user interface 300 may include a strum area 314 (e.g., a strum strip) that enables the user to swipe up or down within the strum area 314 to create the raked sao and fu strums. In some examples, the strum strip may be on the right side of the user interface 300. The strum area 314 may allow direct interaction with the strings by swiping across or tapping on the strings. In some embodiments, a button strum feature may be provided that will rake all four strings automatically. The button strum feature may be provided via any suitable selection interface element such as a button.

In some embodiments, the user interface 300 may include a variation control interface element 320 to control modification of audio output to include one or more repetitive notes according to a picking technique (e.g., the lunzhi picking technique discussed above). The variation control interface element 320 will be discussed further in connection with FIG. 4.

FIG. 4 is a simplified block diagram illustrating another example user interface 400 for a virtual instrument (e.g., a pipa) that includes a variety of user interface elements, according to at least one example. The user interface 400 is intended to depict an example in which the major pentatonic scale has been selected (as indicated with scale selection option 402). Accordingly, the areas between the frets 404 may be individually associated with different notes than the areas between the corresponding frets 310 of FIG. 3. Additionally, or alternatively, the frets 404 may include a greater or fewer number of frets than frets 310 of FIG. 3. The intervallic distance between notes associated with frets 404 may be greater or less than the intervallic distance between notes associated with the frets 310. Any suitable playing option described above in connection with the user interface 300 of FIG. 3 (e.g., fret selection, strum raking, note bending, note sliding, etc.) may be similarly provided by the user interface 400.

In some embodiments, the user interface 400 may include a variation control interface element 406 (e.g., the variation control interface element 320 of FIG. 3). The variation control interface element 406 may be configured to simulate a lunzhi picking technique to a played note (e.g., audio output being provided on the speaker of the device). As discussed above, the lunzhi technique may include a picking technique that involves all four fingers and the thumb of the right hand. In this technique, each of the fingers and thumb are used sequentially to strike the same string. The sequence may be repeated as desired. When variation control interface element 406 is selected by a user, the picking techhnique can be simulated by the virtual pipa instrument. Although the variation control interface element 406 is depicted in FIG. 4 in notes view, it should be appreciated that the variation control interface element 406 may also be available in chords view.

In some embodiments, selecting a location within the variation control interface element 406 while also pressing on one of the frets 404 or within the strum area 408 may present audio output corresponding to the note being repeatedly played, simulating the lunzhi picking technique being performed by a user to repeatedly pick the note on a physical instrument. For devices that are pressure enabled (e.g., for a device in which pressure can be detected by a touch screen), the speed and/or volume of the lunzhi-affected audio output may be modified using pressure on the variation control interface element 406 and/or the note selected. By way of example, a heavier pressure on the fret or the variation control interface element 406 may result in a louder repeated note while a lighter pressure at either location may result in a softer repeated note. The speed of the lunzhi picking may also be modified by movement away from the center of the variation control interface element 406 (e.g., movement to the right results in faster picking while movement to the left results in slower picking). In another embodiment, the speed of the lunzhi simulation may be modified by moving from one end of the variation control interface element 406 to the other end (e.g., far right may result in the fastest simulated picking speed and far left may result in the slowest simulated picking speed, or vice versa).

In some examples, playing the lunzhi technique by the virtual instrument comprises playing a single isolated note, corresponding to a selected fret (or strum of an unfretted note), repeatedly iterated at different speeds (e.g., according to the selected pressure). In some embodiments, the audio sample used to present audio output for a fretted note may differ from the audio sample used to present audio output for the same note with the lunzhi picking technique, although in other embodiments, the same audio sample may be used for both. By way of example, a particular audio sample may be used to produce audio output when a note is selected, while a different audio sample (or set of audio samples) may be utilized to produce the simulated lunzhi picking technique. In some cases, the set of audio samples may include notes that differ slightly in pitch and or volume. By utilizing the set of audio samples that differ from one another slightly, the audio output provided may provide a more authentic sound that more closely resembles the experience of utilizing the lunzhi picking technique on the physical instrument. In some embodiments, when the variation control interface element 406 is active, a slight change will be made to the user interface 400 (e.g., the strings may change color or become illuminated) to prompt the user to select a note while the button is pressed in order to apply the lunzhi picking simulation.

In some embodiments, a simulated vibrato may be applied to the audio output of a note and may be modulated by touch. For example, a simulated vibrato (e.g., pitch modulation) may be applied on direct note touches by pressing harder into the fret selected. As pressure is increased, the pitch modulation of the vibrato may become more apparent, while a decrease in pressure may cause the pitch modulation to be less apparent. In at least one embodiment, simulated vibrato may be applied to direct note touches for which a simulated lunzhi picking technique is not currently being applied. When the variation control interface element 406 is active, then touch inputs may vary the volume of the repeated notes of the simulated lunzhi picking rather than applying simulated vibrato to the audio output of the fretted note.

It should be appreciated that the variation control interface element 406 may be available in notes or chords view, regardless of whether or not a scale selection option has been selected. In some examples, such as when auto-play options are selected, the variation control interface element 406 may not be available on the user interface provided. Auto-play options are discussed in more detail with respect to FIG. 5.

Figure 5:
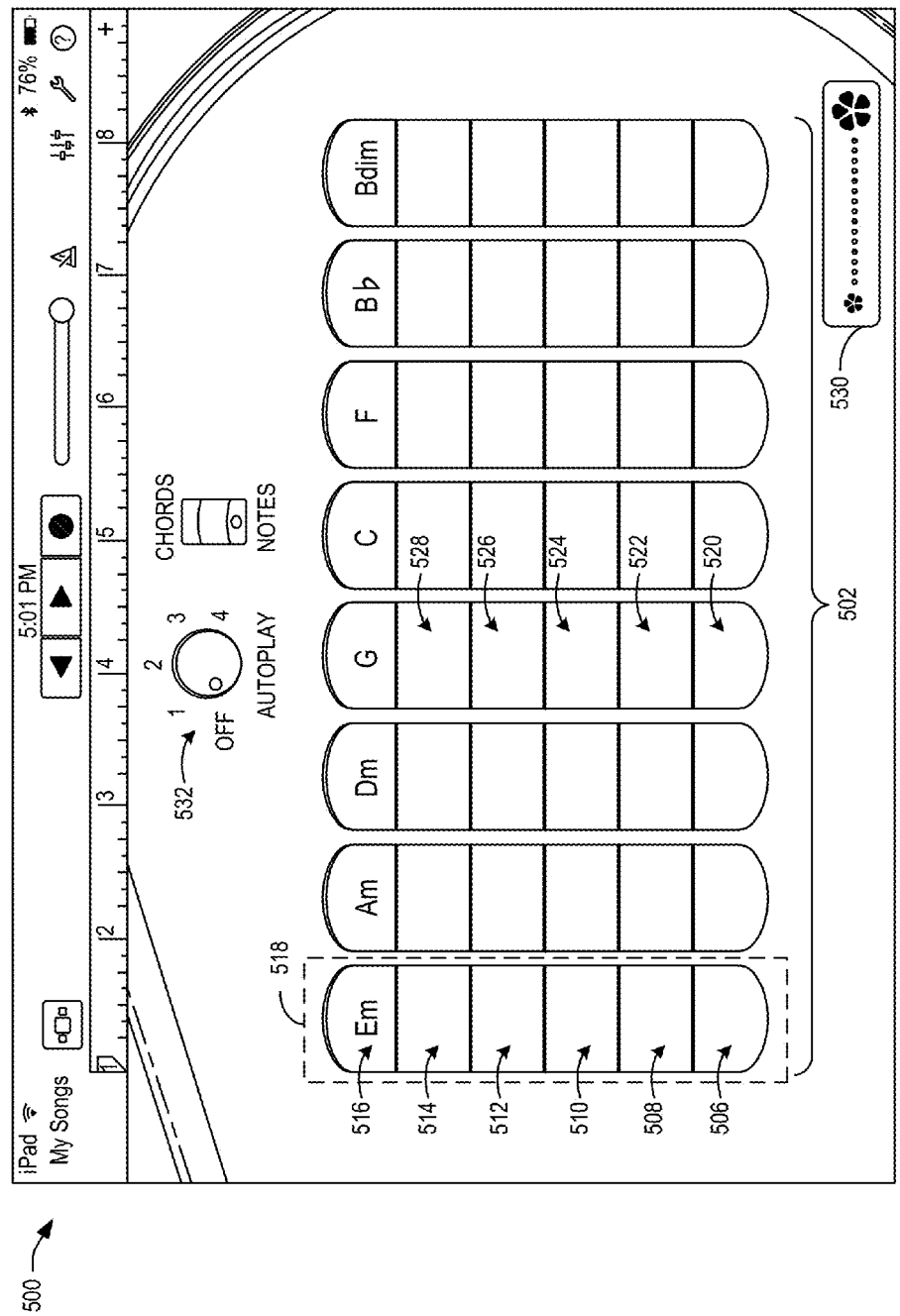
FIG. 5 is a simplified block diagram illustrating yet another example user interface for a virtual instrument (e.g., a pipa) that includes a variety of user interface elements, according to at least one example.

FIG. 5 is a simplified block diagram illustrating yet another example user interface 500 for a virtual instrument (e.g., a pipa) that includes a variety of user interface elements, according to at least one example. The user interface 500 is intended to depict an example of the interface provided in chords view. Chords view may feature a number (e.g., 8) chord strips 502. Each of the chord strips 502 may include a group of note selection areas. For example, note selection areas 506, 508, 510, 512, 514, and 516 may be grouped as depicted at chord strip 518. Any suitable number of chord strips may be utilized and the arrangement and selection of the musical scales associated with the chord strips 502 may vary. For example, the chord strips 518 may follow a standard chord layout, but custom chord options may be provided as well. Each of the note selection areas 506-516 may individually play a single note associated with the musical scale/chord for which they are associated. By way of example, the note selection areas 506-516 may individually play notes used in traditional sounding Chinese scales (e.g., typically Major Pentatonic). In at least one embodiment, only one note selection area may be selected at any given time, while in other embodiments, more than one note selection area may be selected simultaneously.

In at least one embodiment, the chord strips 502 may individually be associated with a particular musical scale (e.g., E minor). For example, the chord strips 502 may be individually associated with musical scales/chords such as E minor, A minor, D minor, G major, C major, F major, B flat major, and B diminished, although not necessarily in that order. The specific chords depicted in FIG. 5 are intended to be illustrative and it is contemplated that any suitable musical scale/chord may be additionally or alternatively utilized. For major schords (e.g., G, C, F, B flat), the corresponding note selection areas may start on the first degree of the scale as the lowest tone on the bottom-most note selection option, and finish with an octave higher tone on the top-most note selection option.

By way of example, the note selection area 506 may correspond to a first degree (e.g., E minor). Note selection areas 508-516 may include the second, third, fifth, seventh, and eight degree of the same scale/chord, although this is not necessarily the case, and the intervallic relationships between the note selection areas may vary. In some embodiments, minor chords strips (e.g., E minor, A minor, D minor, etc.) may include a root of minor chord (e.g., E in E minor) corresponding to the bottom-most note selections option and an octave higher root note corresponding to the top-most note selection option. The remaining note selection areas may include note associated with a relative major scale (e.g., G Major Pentatonic for the Em Chord). By way of example, the note selection area 520 may produce a same note as the note selection area 508. Note selection areas 522 and 510, 524 and 512, 526 and 514, and 528 and 516 may similarly produce the same note as paired. In some embodiments, diminished chord strips (e.g., B dim) may include a root of the diminished chord at the bottom-most note selection area and an octave higher root not corresponding to the top-most note selection option. The remaining note selection areas may include notes associated with a relate V chord.

In at least one example, a variation control interface element 530 (e.g., the variation control interface element 406 of FIG. 4) may be provided within the chords view of user interface 500. The variation control interface element 530 may function in much the same manner as the described above with respect to the variation control interface element 406 of FIG. 4. By way of example, a note selection area 508 may be selected. While selected, the variation control interface element 530 may be selected to apply a simulated lunzhi picking technique to the selected note resulting in audio output that includes repeating the selected note in accordance with the speed indicated with the variation control interface element 530. The speed and/or volume of the repeated notes may be control in a similar manner as described above using locations within the variation control interface element 530 and/or touch input at a note selection area and/or at the variation control interface element 530.

In some embodiments, an auto-play knob 532 may be presented in the chords view or another suitable portion of the user interface 500. The auto-play knob 532 may have any suitable number (e.g., 5) of positions (e.g., off, 1, 2, 3, and 4). Selecting any of the auto-play positions (e.g., by turning the auto-play knob 532) may enable the user to tap on a note selection area of a chord strip strips to play an associated musical arrangement. Each position may be associated with a particular pre-generated musical arrangement. In some embodiments, once an auto-play knob position is selected, the chord strips 502 may individually include a single note selection area rather than multiple note selection areas. During playback of the musical arrangement (or to initiate playback of the musical arrangement), the user may modify the key in which the arrangement is played by selecting any one of the chord strips 502. In at least one example, the variation control interface element 530 may be selectable during playback of an auto-play arrangement. During playback, the user may continue to select various note selection areas to modify the arrangement to correspond to a same or different key. In some examples, selection of a note selection area may modify the arrangement only with respect to the key being utilized.

Figure 6:
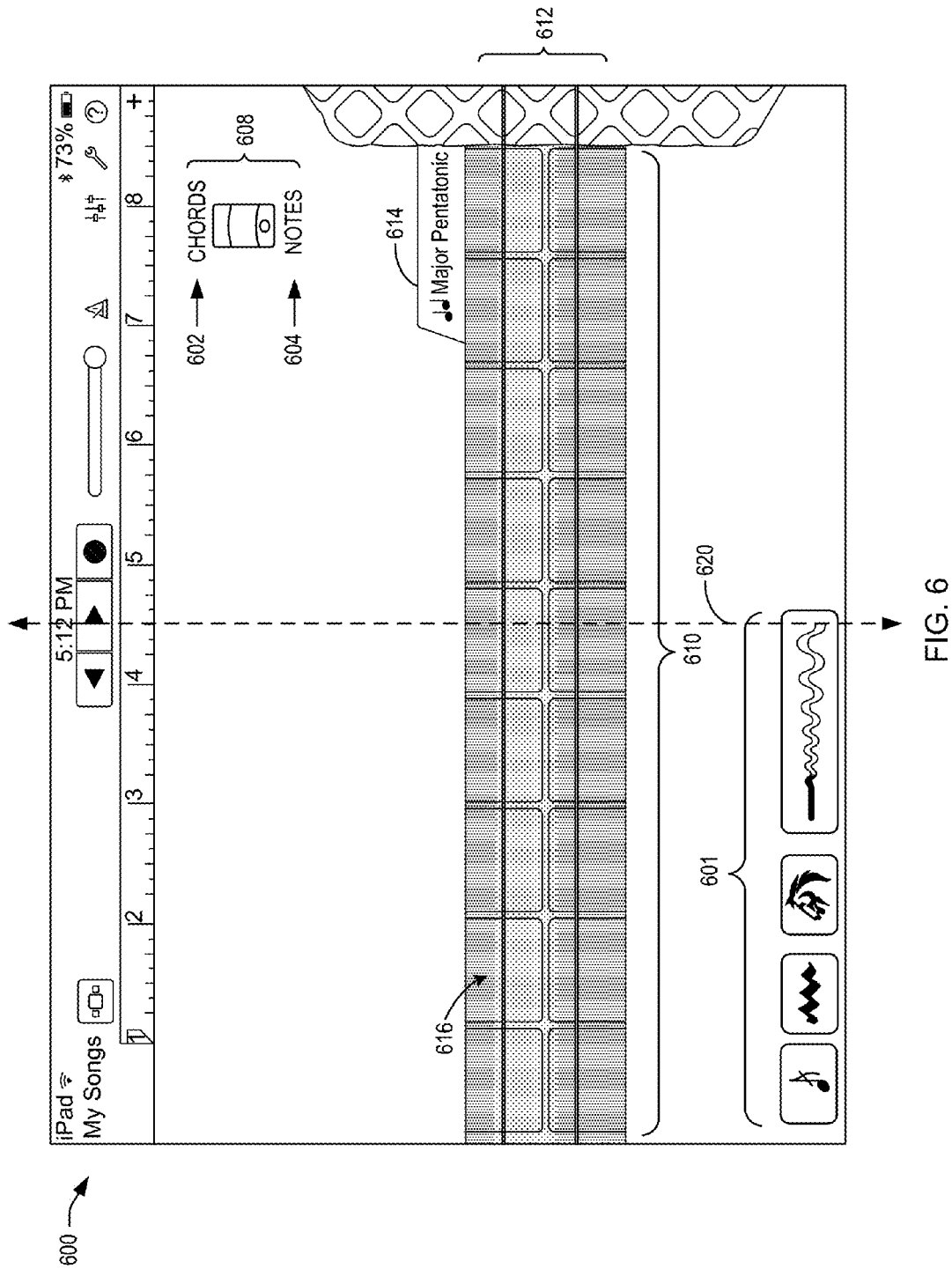
FIG. 6 is a simplified block diagram illustrating an example user interface for a virtual instrument (e.g., an erhu) that includes a variety of ornamental interface elements, according to at least one example.

FIG. 6 is a simplified block diagram illustrating an example user interface 600 for a virtual instrument (e.g., an erhu) that includes a variety of ornamental interface elements 601, according to at least one example. The ornamental interface elements 601 will be discussed in further detail below with respect to FIG. 7. In some examples, the user interface 600 will have two main view options (e.g., "Notes" option 602 and "Chords" option 604). In some examples (e.g., on a mobile device), there will be a transitional element (view controller 606) which will allow the user to switch between Notes view and Chord view by selecting "notes" option 602 or "chords" option 604. In some embodiments, the "notes" option 602 and/or the "chords" option 604 may be labeled with other names (e.g., "chords" option 604 may be indicated with the word "harmony"). FIG. 6 is intended to illustrate the notes view of the erhu while FIG. 8 will discuss the chords view in more detail.

Within the notes view of the user interface 600, the user may be enabled to interact with a version of the neck that is laid out chromatically with intervallic relationships that match the physical (e.g., real) instrument. In some examples, note selection area 610 and strings 612 (e.g., two strings) may be presented within the user interface 600 to emulate the look of an actual erhu instrument. In notes view, the user interface 600 may also feature a scale selection option 614, which may enable the user to switch to a fixed scale. For example, upon selecting the scale selection option 614, the user may be presented with a pop-up or other suitable menu from which a musical scale may be selected. Once a scale is selected (e.g., Major Pentatonic), string locations within the note selection area 610 (e.g., string location 616) may be associated with particular notes within the musical scale selected. In some embodiments, sub-areas of the note selection area 610 corresponding to notes associated with a string location may be shaded to provide a visual cue for the user.

In at least one embodiment, a user may select a string location within the note selection area 610 (e.g., by selecting a string location along one of the strings 612). In response to the selection, audio output corresponding to an audio sample of the note selected may be presented via a speaker of the device. In some examples, sliding up or down a string may produce a glissando. In at least one embodiment, only one note of one string may be played at a time in order to emulate the paying capabilities of a real erhu. Upon selecting a string location, the string itself may brighten and/or appear to vibrate to give a visual indication that the audio sample corresponding to the string is being played. The note may be steadily maintained for as long as the selection is maintained (e.g., as long as a finger is touching the string location). Note volume may be based at least in part on an attack accelerometer value mapped to a MIDI velocity. Accordingly, a light tap may produce a quieter note, while a harder tap may produce a louder note. In some examples, volume may be modulated by touch. That is, greater pressure on the string may produce a louder sound than a lighter pressure would. Thus, a user may initiate a note by selecting a string location and, while the note is playing, increase the volume of the note by pressing inward.

The strings 612 may be configured to be dragged upward or downward at the string location selected. The dragging motion may produce a pitch bend request indicating the string location corresponding to a note and a distance dragged. In some embodiments, a pitch bend request may be initiated by selecting a string location (e.g., the string location 616) and tilting the device. Accordingly, the pitch bend request may include an angle and direction of tilt of the computing device. The distance dragged and/or the angle and direction of tilt may be used to determine a degree to which the simulated note should be bent. In some examples, dragging upward may bend the note upward (e.g., raise the pitch/frequency) to an amount that is based on the distance dragged or angle of tilt. Similarly, dragging downward may bend the note downward (e.g., lower the pitch/frequency). However, in some examples, a bend upward or downward may the same type of bend to be performed (e.g., both raise the pitch/frequency or both lower the pitch/frequency). A threshold distance/angle may be predetermined that constrains the bend to a certain pitch difference from the original note. In other words, the bend may occur proportional to the distance dragged until a threshold distance is met or exceeded, at which point a particular pitch difference (e.g., a whole step pitch from the original note, a half step pitch from the original note, etc.) may be maintained. Similarly, a bend may be performed until a threshold angle of tilt (e.g., 15 degrees) is exceeded, at which point the particular pitch difference may be maintained. In some embodiments, notes may be pre-bent utilizing a tilt of the computing device in a similar manner as described above in connection with FIG. 3.

In some embodiments, the user interface 600 may enable the user to perform a glissando playing technique. For example, a user may select a string location within note selection area. The user may then maintain contact with the device screen and slide his finger up or down the string. As the finger slides up or down, presented audio output may increase in pitch or decrease in pitch accordingly. Upon completion of a sliding motion, a string location may be determined nearest to the ending location of the glissando and a corresponding note may be presented via the speaker of the device.

Figure 7:
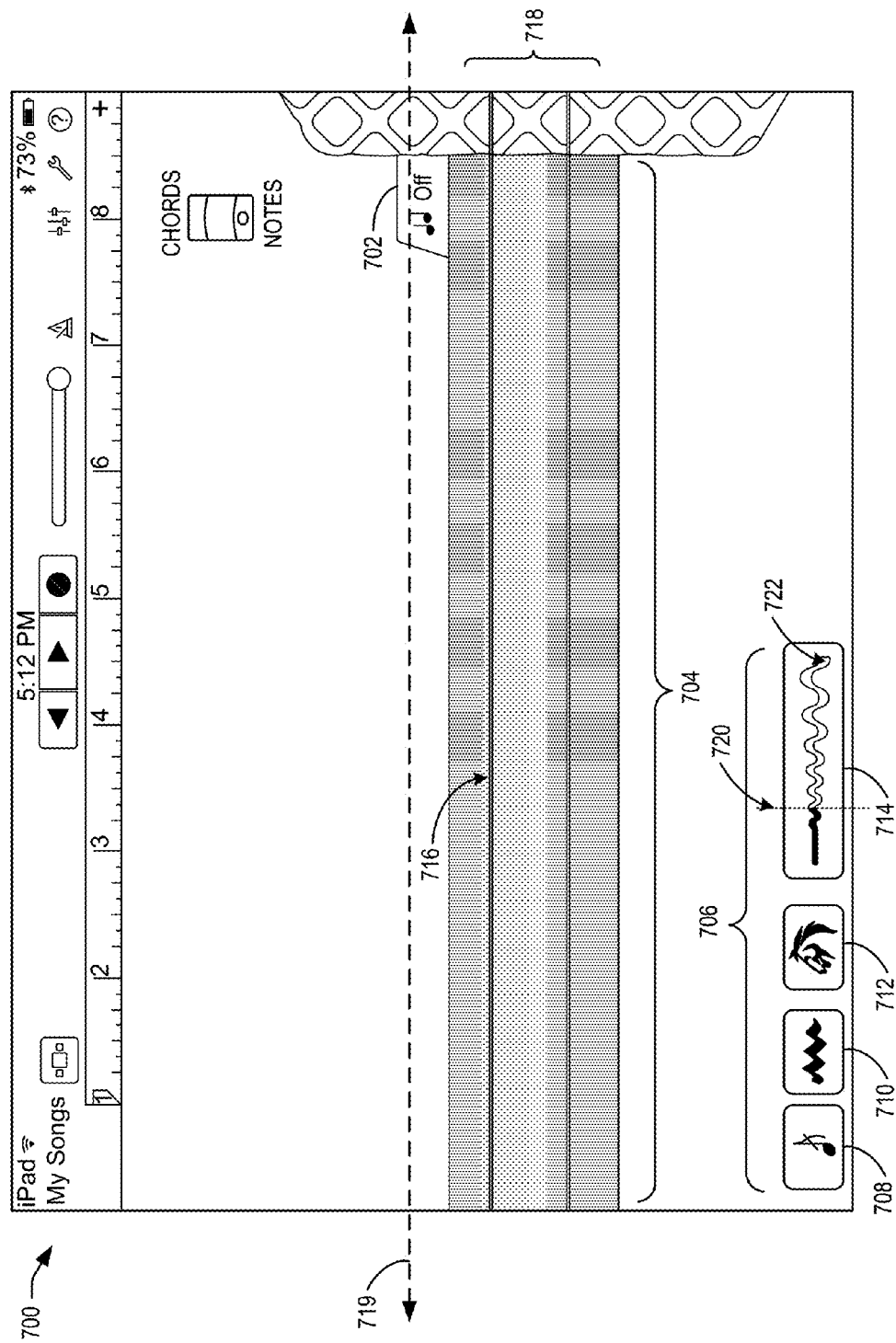
FIG. 7 is a simplified block diagram illustrating another example user interface for a virtual instrument (e.g., an erhu) that includes a variety of ornamental interface elements, according to at least one example.

FIG. 7 is a simplified block diagram illustrating another example user interface 700 for a virtual instrument (e.g., an erhu) that includes a variety of ornamental interface elements 706 (e.g., the ornamental interface elements 601 of FIG. 6, according to at least one example. The user interface 700 is intended to depict an example in which the msuical scale has been turned off (as indicated with scale selection option 702). Accordingly, string locations within the note selection area 704 may be individually associated with different notes than the string locations within the note selection area 610 of FIG. 6. In some embodiments, the note selection area 704 may or may not include sub-area shading as was depicted in FIG. 6. It should be appreciated that any suitable playing option described above in connection with the user interface 600 of FIG. 6 (e.g., string location selection, volume manipulation, glissando, etc.), may be similarly provided by the user interface 700.

In some embodiments, several ornamental control interfaces (e.g., the ornamental interface elements 706) may be provided. In some examples, the ornamental interface elements 706 may include a grace-note control interface element 708, a trill control interface element 710, a horse-effect selection interface element 712, a vibrato control interface element 714, or any suitable combination of the above. Each of the ornamental interface elements 706 may be utilized to modify a pitch/frequency of the audio output according to a predetermined pattern and/or to present a series of two or more audio outputs according to a predetermined pattern.

The grace-note control interface element 708 may be utilized to provide a simulated grace note to a note being presented according to a selected string location. As discussed above, a grace note is generally considered to refer to an extra note that precedes a note to provide an embellishment that is not essential to the harmony or melody. A grace note pattern may indicate a single note played immediately preceding the note corresponding to the selected string location. In some embodiments, the user may select a string location (e.g., string location 716). While maintaining contact with string location, the grace-note control interface element 708 may be selected. Upon receiving the indication that the grace-note control interface element 708 has been selected, a simulated grace note may be provided with the note corresponding to the string location 716 and in accordance with the grace note pattern. In some examples, the simulated grace note may be a particular intervallic distance in pitch from the note corresponding to the selected string location. For example, the simulated grace note may be configured to correspond to a scale selected via the scale selection option 702. That is, the simulated grace note played may be a note that immediately precedes the selected note within the selected musical scale. In other examples, such as when a scale selection option is not active (e.g., as depicted by "off"), the grace note may differ a half step or a whole-step in pitch from the note corresponding to the string location 716.

In some embodiments, any of the interfaces described herein with respect to the erhu may be configured to determine a velocity associated with an attack or contact with the strings 718. A high velocity attack at a string location may, cause a grace note or mordent to be presented immediate before the note associated with the selected string location is played/replayed. A mordent is generally thought of as a rapid alternation between an indicated note, the note above/below, and the indicated note again. In at least one example, when the grace-note control interface element 708 is selected with light (e.g., under a threshold) pressure, a grace note may be provided. Accordingly, when the grace-note control interface element 708 is selected with heavy pressure (e.g., equal to or over a threshold pressure), a mordent may be provided.

In at least one embodiment, the grace-note control interface element 708 may be available in notes or chords view, regardless of whether or not a scale selection option has been selected. In some examples, such as when auto-play options are selected, the grace-note control interface element 708 may not be available on the user interface provided. Auto-play options are discussed in more detail with respect to FIG. 8.

The trill control interface element 710 may be used to provide a trill simulation using the note being presented and in accordance with a selected string location. A trill pattern may be selected that indicates a rapid alternation between two notes (e.g., the note corresponding to the string location 716 and another note above/below the note). In some embodiments, the user may select a string location (e.g., string location 716). While maintaining contact with string location 716, the trill control interface element 710 may be selected. Upon receiving the indication that the trill control interface element 710 has been selected, a trill simulation may be provided utilizing the note of the string location 716 and in accordance with the trill pattern. In some examples, the trill pattern may indicate a particular intervallic distance in pitch from the note corresponding to the string location 716. For example, the trill note utilized in the trill simulation may correspond to a scale selected via the scale selection option 702. That is, the trill note used in the trill simulation may be a note that immediately precedes or follows the selected note within the selected musical scale. In other examples, such as when a scale selection option is not active (e.g., as depicted by "off"), the trill note may differ a half step or a whole-step in pitch from the note corresponding to the string location 716.

In at least one example, the speed of the trill simulation may vary according to a pressure applied at the trill control interface element 710. By way of example, when the trill control interface element 710 is selected with light (e.g., under a threshold) pressure, a simulated trill of a particular speed may be provided. When the trill control interface element 710 is selected with heavier pressure (e.g., equal to or over a threshold pressure), the simulated trill may be provided at a faster speed. If the pressure were to be decreased while the trill simulation is still being provided, the trill simulated may slow according to the decrease in pressure.

In at least one embodiment, the trill control interface element 710 may be available in notes or chords view, regardless of whether or not a scale selection option has been selected. In some examples, such as when auto-play options are selected, the trill control interface element 710 may not be available on the user interface provided.

In at least one embodiment, the horse-effect selection interface element 712 may be configured to provide a series of two or more notes according to a horse-effect pattern when a string location is selected. A horse effect is typically associated with a series of notes played on a stringed instrument that generally resemble a whinny of a horse. In some examples, the horse-effect selection interface element 712 may cause a predetermined horse-effect audio sample (e.g., a horse-effect simulation) to be presented on the speaker of the device. The selected horse-effect audio sample may be selected (e.g., at random, in a particular order, etc.) from a set of horse-effect audio samples.

In some embodiments, the appearance of the horse-effect selection interface element 712 may be modified (e.g., lit up, change color, etc.) upon selection, such that activation of the horse-effect selection interface element 712 may be visually ascertainable. The user may then select a string location (e.g., the string location 716). Upon selection, of the string location 716, a selected horse-effect may be played on the speaker of the device. Alternatively, the horse-effect selection interface element 712 may be selected after a string location has already been selected and audio output corresponding to the string location is currently being presented.

In at least one embodiment, the horse-effect selection interface element 712 may be available in notes or chords view, regardless of whether or not a scale selection option has been selected. In some examples, the horse-effect selection interface element 712 may not be available in chords view.

In at least one embodiment, the vibrato control interface element 714 may be configured to modify the pitch of audio output corresponding to a selected string location (e.g., the string location 716). In some embodiments, selecting a location within the vibrato control interface element 714 may cause a default vibrato amount (e.g., corresponding to default vibrato amount 720) to be set as indicated by a vibrato indicator 722. In at least one example, tilting forward along the y-axis (e.g., axis 719) past an initial attack angle (e.g., the angle of the electronic device when the string location 716 was selected) by a suitable threshold (e.g., 15 degrees, 20 degrees, etc.) may increase the simulated vibrato applied to the audio output. The vibrato indicator 722 may be modified to depict a change in the amount of simulated vibrato corresponding to the tilt or location selected.

Once set, the default vibrato amount may control how much or how little simulated vibrato is applied to the audio output corresponding to the selected string location and subsequent audio output corresponding to future selected string locations. For devices that are pressure enabled (e.g., for a device in which pressure can be detected by a touch screen), the speed of the simulated vibrato may be modified using pressure on the vibrato control interface element 714 and/or at the string location 716. By way of example, a heavier pressure on string location 716, or the vibrato control interface element 714, may result in a deeper simulated vibrato (e.g., greater pitch variation at a same or slower speed). A lighter pressure on string location 716, or the vibrato control interface element 714, may result in shallower simulated vibrato (e.g., less pitch variation at a same or faster speed). The amount of simulated vibrato applied to the audio output may be adjusted by moving from one end of the vibrato control interface element 714 to the other end (e.g., far right may result in the deepest vibrato available being applied to the audio output and far left may result in no vibrato being applied to the audio output).

It should be appreciated that the vibrato control interface element 714 may be available in notes or chords view, regardless of whether or not a scale selection option has been selected. In some examples, such as when auto-play options are selected, the variation control interface element 406 may not be available on the user interface provided. Auto-play options are discussed in more detail with respect to FIG. 5.

Utilizing the ornamental selection interface discussed here to interject ornamental features within audio output of a music application may produce sounds that more accurately emulate traditional playing techniques of the physical instrument and/or a musical style than audio output played by traditional virtual instruments.

Figure 8:
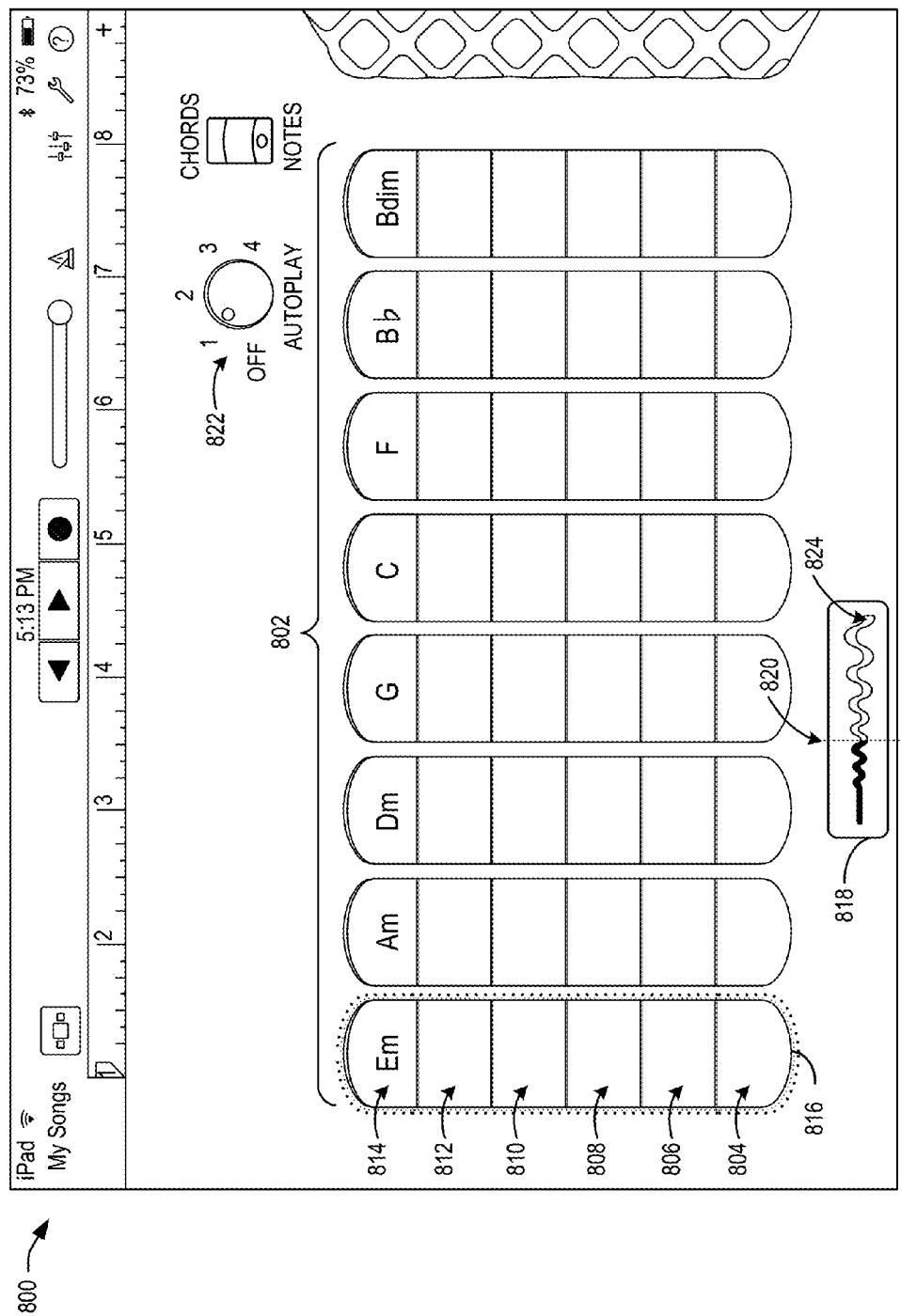
FIG. 8 is a simplified block diagram illustrating yet another example user interface for a virtual instrument (e.g., an erhu) that includes a variety of ornamental interface elements, according to at least one example.

FIG. 8 is a simplified block diagram illustrating an example user interface for a virtual instrument (e.g., an erhu) that includes a variety of user interface elements, according to at least one example. The user interface 800 is intended to depict an example of the user interfaces 600 and 700 provided in chords view. Chords view may feature a number (e.g., 8) chord strips 802. Each of the chord strips 802 may include a group of note selection areas. For example, note selection areas 804, 806, 808, 810, 812, and 814 may be grouped as depicted at chord strip 816. Any suitable number of chord strips may be utilized and the arrangement and selection of the musical scales associated with the chord strips 802 may vary. For example, the chord strips 802 may follow a standard chord layout, but custom chord options may be provided as well. Each of the note selection areas 804-814 may individually provide audio output corresponding to a single note associated with the musical scale/chord. By way of example, the note selection areas 804-814 may individually correspond to notes used in traditional sounding Chinese scales (e.g., typically Major Pentatonic). In at least one embodiment, only one note selection area from a chord strip may be utilized to provide audio output at any given time.

In at least one embodiment, the chord strips 802 may individually be associated with a particular musical scale (e.g., E minor). For example, the chord strips 502 may be individually associated with musical scales/chords such as E minor, A minor, D minor, G major, C major, F major, B flat major, and B diminished, although not necessarily in that order. The specific chords depicted in FIG. 8 are intended to be illustrative and it is contemplated that any suitable musical scale/chord may be additionally or alternatively utilized. The note selection areas within each of the chord strips 802 may be similarly arranged and representative of similar note combinations as described above in connection with FIG. 5. In at least one embodiment, a selection of a note selections area within a chord strip may illuminate the chord strip or may cause any suitable visual indicator that the chord strip is active.

In at least one example, a vibrato control interface element 818 may be provided within the chords view of user interface 800. The vibrato control interface element 818 may function in much the same manner as the described above with respect to the vibrato control interface element 714 of FIG. 7. By way of example, a note selection area 804 may be selected. While audio output corresponding to the note selection area 804 is being provided, the vibrato control interface element 714 may be selected to apply simulated vibrato corresponding to the default vibrato amount indicated at 820 to the audio output. The speed and/or intensity of the simulated vibrato may be controlled in a similar manner as described above by selecting locations within the vibrato control interface element 714 and/or by touch input at a note selection area and/or at the vibrato control interface element 714.

In some embodiments, the user may drag his finger (e.g., vertically) between note selection areas within a chord strip (e.g., the chord strip 816). By doing so, audio output corresponding to a glissando may be presented via a speaker of the electronic device.

In some embodiments, an auto-play knob 822 may be presented in the chords view or another suitable portion of the user interface 500. Similar to the auto-play knob 532 of FIG. 5 described above, the auto-play knob 532 may have any suitable number (e.g., 5) of positions (e.g., off, 1, 2, 3, and 4). Selecting any of the auto-play positions (e.g., by turning the auto-play knob 822 clockwise or counterclockwise) may enable the user to tap on individual chord strips to play an associated musical arrangement. Each position may be associated with a particular pre-generated musical arrangement. At least some of the pre-generated musical arrangements may be curated from traditional well-known Chinese erhu melodies. In some embodiments, once an auto-play knob position is selected, the chord strips 802 may individually include a single note selection area rather than multiple note selection areas. During playback of the musical arrangement (or to initiate playback of the musical arrangement), the user may modify the key in which the arrangement is played by selecting any one of the chord strips 802. In at least one example, the vibrato control interface element 818 may be selectable during playback of an auto-play arrangement.

With respect to the FIGS. 3-8 described above, it should be appreciated that any suitable interface element (e.g., the variation control interface element 406/530 and/or ornamental interface elements 706) may be manipulated by tilt behaviors of the electronic device. Accordingly, tilting the electronic device in the X-axis (e.g., the axis 318 and the axis 618) may modulate the existing touch-generated audio output. By way of example, tilting in the X-axis counterclockwise may reduce volume (expression). Tilting in the x-axis clockwise may increase volume (expression). In at least one embodiment, changes to expression data based on x-axis tilt may be performed only after the user has tilted the device beyond a certain angular threshold deviation from the angle of initial note attack. For instance, if the threshold to begin modulation of audio output is 15 degrees, if the initial attack of a note has the electronic device angled at 30 degrees, modulation of the audio output may not begin until the electronic device has been tilted to 45 degrees or 15 degrees away from the starting angle. In some embodiments, a maximum increase or decrease of audio output (e.g., by volume or pitch) may be reached when the electronic device is tilted some threshold (e.g., 45 degrees, 60 degrees, etc.) away from the starting angle.

In at least one embodiment, tilting the device in the y-axis (e.g., the y-axis 620 of FIG. 6) may modulate the existing setting for the vibrato control interface element (e.g., the vibrato control interface elements 720 or 820). In some cases, the tilt along the y-axis may cause an increase of the simulated vibrato applied to a note, while in other cases, the tilt may not change the simulated vibrato at all. In at least one example, tilting forward along the y-axis past the initial attack angle by a suitable threshold (e.g., 15 degrees, 20 degrees, etc.) may increase a corresponding indicator (e.g., vibrato indicator 824 of FIG. 8) to depict a change in the amount of simulated vibrato being applied to the audio output. The vibrato indicator may return to a last default setting prior to each subsequent note selection. In some embodiments, tilting in the y-axis backwards from an initial attack may have no effect to the amount of simulated vibrato to be applied and/or the corresponding indicator within the vibrato control interface element, but may serve as a reset to the initial attack angle.

In at least some embodiments, accelerometer data from the electronic device may map directly to a MIDI velocity associated with an audio sample. Accordingly, more aggressive attach samples may be presented for higher velocity attacks while softer attack samples may be presented for lower velocity attacks. The accelerometer may also control some percentage of the audio output while the note is selected. For example, higher accelerometer attacks may modulate the pitch of a note higher, while lower accelerometer attacks may modulate the pitch of a note lower. Additionally, the pitch of the note mat be modulated by tap position, and further modulated post-attack by a vertical drag gesture (such as the pitch bend actions discussed above).

By utilizing the user interfaces 300-800 and the corresponding interface elements (e.g., variation control interfaces, ornamental control interfaces), the user is enabled to decorate their performance with musical events such as grace notes, mordents, and trills. These events are different from other performance modifiers such as vibrato and pitch bend since they add additional notes, rather than modulating a single performed note.

Figure 9:
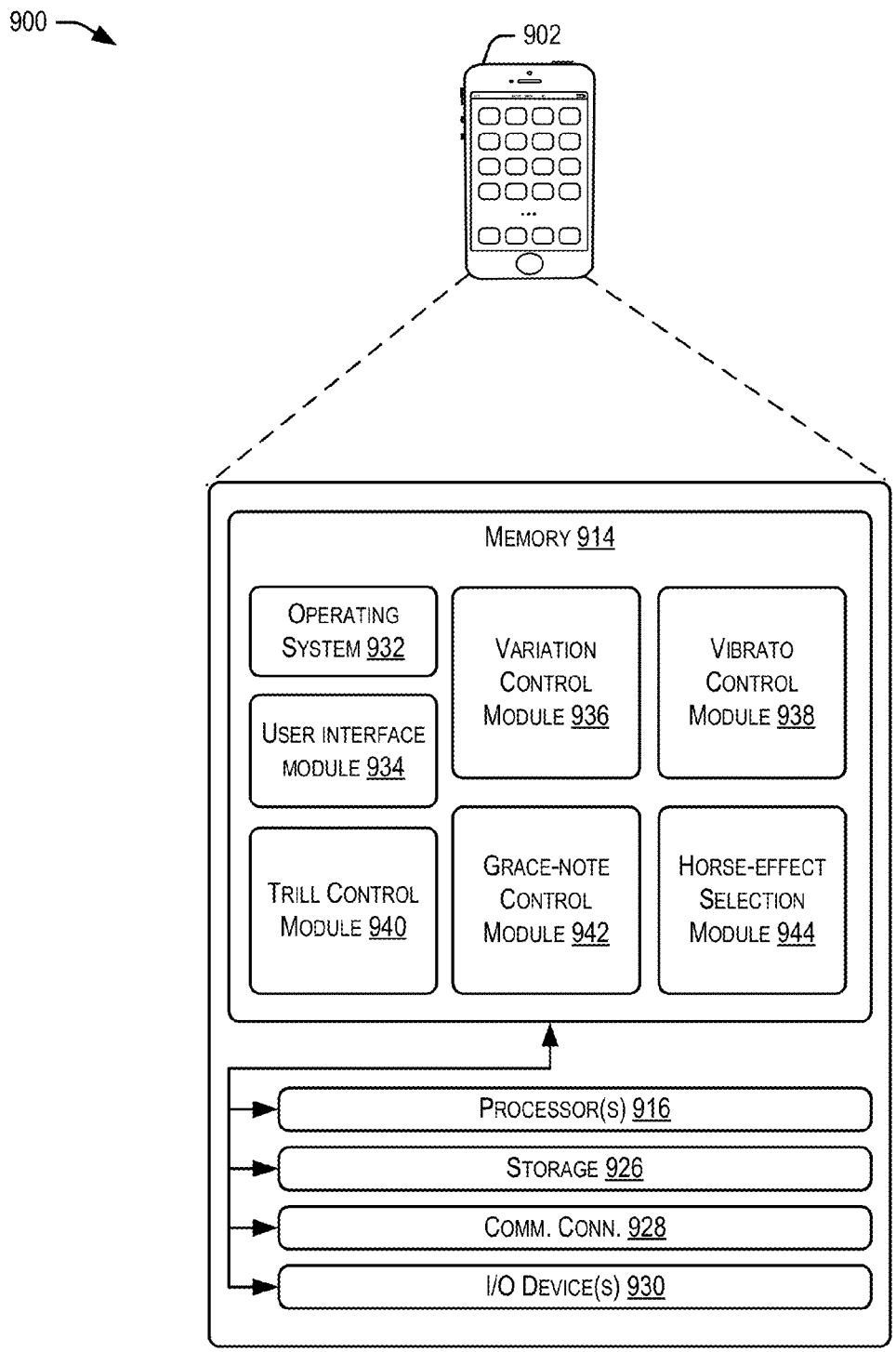
FIG. 9 is a simplified block diagram illustrating an example architecture for implementing interfaces for interacting with a virtual instrument as described herein, according to at least one example.

FIG. 9 is a simplified block diagram illustrating an example architecture 900 for implementing a user interface for interacting with a virtual instrument as described herein, according to at least one example. In some examples, a computing device 902 (e.g., the user device 112 and/or the user device 212 of FIGS. 1 and 2, respectively) of the example architecture 900 may be configured to present a user interface (e.g., user interfaces 300, 400, 500, 600, 700, 800, and the like). The user interface may include any suitable number and configuration of the user interface elements above.

As noted above, the computing device 902 may be configured to execute or otherwise manage applications or instructions for presenting user interfaces/interface elements such as, but not limited to, a user interface for playing one or more virtual instruments. The computing device 902 may collect receive inputs (e.g., touch inputs) from a user at the user interface, determine which audio samples to play in order to simulate playing a physical instrument, and then present audio output corresponding to the audio samples utilizing the I/O device(s) 930 (e.g., a speaker of the computing device 902). The computing device 902 may further receive input (e.g., touch input) from one or more user interface elements such as the ones described above in connection with FIGS. 1-8. The computing device 902 may be configured to determine other appropriate audio samples and/or modify current audio output in accordance with input received from one or more user interface elements.

The computing device 902 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the computing device 902 may include at least one memory 914 and one or more processing units (or processor(s)) 916. The processor(s) 916 may be implemented as appropriate in hardware, computer-executable instructions, or combinations thereof. Computer-executable instruction or firmware implementations of the processor(s) 916 may include computer-executable or machine-executable instructions written in any suitable programming language to perform the various functions described.

The memory 914 may store program instructions that are loadable and executable on the processor(s) 916, as well as data generated during the execution of these programs. Depending on the configuration and type of the computing device 902, the memory 914 may be volatile (such as random access memory (RAM)) and/or non-volatile (such as read-only memory (ROM), flash memory, etc.). The computing device 902 may also include additional removable storage and/or non-removable storage 926 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 914 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 914 and the additional storage 926, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 914 and the additional storage 926 are both examples of non-transitory computer storage media. Additional types of computer storage media that may be present in the computing device 902 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the computing device 902. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 902 may also contain communications connection(s) 928 that allow the computing device 902 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The computing device 902 may also include I/O device(s) 930, such as a touch input device, a keyboard, a mouse, a pen, a voice input device, a display, a speaker, a printer, etc.

Turning to the contents of the memory 914 in more detail, the memory 914 may include an operating system 932 and/or one or more application programs or services for implementing the features disclosed herein including a user interface module 934, a variation control module 936, a vibrato control module 938, a trill control module 940, a grace-note control module 942 and a horse-effect control module 944. The memory 914 may also be configured to store one or more audio samples to be used to produce audio output. In this way, the computing device 902 can perform all of the operations described herein, including implementing the entire virtual instrument application, without connection to any other computing devices or networks. For example, the virtual instrument application can be executed locally with locally stored samples.

In some examples, the user interface module 934 may be configured to manage the user interface of the computing device 902. For example, the user interface module 934 may present the user interfaces 300, 400, 500, 600, 700, 800, or any suitable user interface for interacting with a virtual instrument. Further, the user interface module 934 may be configured to present one or more options for simulating or otherwise playing the virtual instruments in the manner described above. Additionally, in some examples, the user interface module 934 may be configured to receive and/or interpret user input (e.g., touch input), user interface element selections, and/or gesture information (e.g., via touch screen) for interacting with the virtual instruments. For example, a user may tap a virtual string of a virtual instrument to cause the computing device 902 to provide audio output corresponding to a note on a speaker of the computing device 902. As another example, the user interface module 934 may be configured to provide audio output corresponding to multiple audio samples when input is received at the strum area 314.

In some embodiments, the user interface module 934 may be configured to receive input (e.g., touch input) corresponding to a pitch bend request. The pitch bend request may include a selected string location, a distance or angle the selected string has been dragged, and/or a tilt angle of the computing device 902. Upon receiving the pitch bend request, the user interface module 934 may be configured to determine an amount to modify the pitch of audio output provided. In some examples, the distance and/or angle for which the string has been virtually dragged, or the tilt angle of the computing device 902 may be utilized to determine the pitch modification. By way of example, a maximum bend value (e.g., a maximum frequency change value) may be predetermined and stored in memory. The user interface module 934 may be configured to determine a pitch change value based on the distance/angle of the dragged string, or the tilt angle of the computing device 902. In some examples, if the distance/angle exceeds a threshold distance/angle, the maximum frequency change value may be utilized. Whereas, if the distance/angle does not exceed the threshold, the pitch may be modified as a function of the distance dragged or the angle made by the bent string. Similarly, if the tilt angle of the computing device 902 exceeds a threshold tilt angle (e.g., 15 degrees, 20 degrees, etc.), the maximum frequency change value may be utilized. Whereas, if the tilt angle does not exceed the threshold, the pitch may be modified as a function of the tilt angle. Accordingly, the user interface module 934 may be configured to modify the pitch of the audio output provided based on the pitch bend request received.

In some embodiments, the user interface module 934 may be configured to receive input (e.g., touch input) corresponding to an auto-play request. The auto-play request may be initiated via an auto-play knob (e.g., the auto-play knob of 532). In some examples, the auto-play knob may be presented in the chords view or another suitable portion of a user interface provided by the user interface module 934 (e.g., the user interface 500). The auto-play request may include an auto-play selection value (e.g., corresponding to an option provided via the auto-play knob 532 such as "off," 1, 2, 3, and 4). The user interface module 934 may be configured to store the auto-play selection value. Upon receiving additional input (e.g., touch input indicating a selection of a note selection area of a chords strip of FIG. 5) indicating a key selection. Upon receipt of the additional input, the user interface module 934 may be configured to determine a particular pre-generated musical arrangement corresponding to the auto-play selection value stored. Upon determining the pre-generated musical arrangement, the user interface module 934 may be configured to provide audio output corresponding to the musical arrangement and the key selection. During playback of the musical arrangement, the user interface module 934 may be configured to receive subsequent inputs corresponding to additional key selections (e.g., from additional note selection areas) and may modify the key in which the arrangement is played based on the subsequent inputs. In at least one example, the user interface module 934 may be configured to receive an input that indicates the auto-play feature has been turned off. Accordingly, the user interface module 934 may be configured to cease playback of the musical arrangement in response to the received input.

In some examples, the user interface module 934 may be configured to provide and receive a request utilizing input received at a scale selection option (e.g., the scale selection options 316, 402, 614, and 702 of FIGS. 3, 4, 6, and 7, respectively). Upon receipt of the request, the user interface module 934 may be configured to provide a number of scale selection options on the display of the computing device 902 such as a popup window, a menu, or other suitable selection element. The user interface module 934 may be configured to receive a selection of a scale. Upon receipt, the user interface module 934 may reconfigure the user interface to correspond to the scale selection. Reconfiguring the user interface may include associating fret positions, fret selection areas, string locations, or the like with particular musical notes associated with the scale. In some examples, reconfiguration of the user interface may be in accordance with a predetermined configuration that is associated with the scale.

In at least one embodiment, the user interface module 934 may be configured to receive a request to provide a chords view or a notes view of the user interface via a view controller (e.g., the view controller 306 and 608 of FIGS. 3 and 6, respectively). Upon receipt of the request, the user interface module 934 may be configured to reconfigure the user interface to correspond to the view selected. For example, the user interface module 934 may be configured to provide the user interface 300 for a pipa virtual instrument when the request indicates a selection of "notes" view and the user interface 500 for the pipa virtual instrument when the request indicates a selection of the "chords" view.

The variation control module 936, in some cases, may be configured to process received input (e.g., touch input) associated with a variation control interface element (e.g., the variation control interface elements 116, 320, 406 and 530 of FIGS. 1, 3, 4, and 5, respectively). Upon receiving input, the variation control module 936 may be configured to determine a speed and/or volume at which to repeatedly play a note to simulate a particular picking pattern in order to accurately simulate the playback of notes based at least in part on the input. By way of example, a touch pressure (e.g., at a variation control interface element or at a note selection location such as a fret selection area) or an indicated location within a variation control interface element may be determined from the received input. Based on the touch pressure or the indicated location, the variation control module 936 may determine a corresponding speed and/or volume. In some examples, the speed and/or volume may be determined utilizing a mapping of a pressure/location input to a corresponding speed and/or volume.

In at least one embodiment, the variation control module 936 may be configured to select a suitable audio sample with which to provide audio output. In some examples, the audio sample may correspond to an audio sample currently being used to provide audio output. That is, an audio sample corresponding to a simulated note currently being presented on a speaker of the computing device 902 may be selected by the variation control module 936. In at least one example, the variation control module 936 may be configured to select (or generate) a set of audio samples with which to provide audio output. The set of audio samples may include one or more audio samples that may differ from an audio sample for providing audio output that is not related to a variation control interface element selection. For example, the set of audio samples may include audio samples that differ slightly in pitch and/or volume as an audio sample used to provide audio output corresponding to a note selection. Once selected, the variation control module 936 may utilized the set of audio samples to provide audio output including a lunzhi simulation on a speaker of the computing device 902. Alternatively, the audio sample currently being used to provide audio output may be modified to include the lunzhi simulation on the speaker of the computing device 902. The speed and/or volume of the lunzhi simulation may be in accordance with the speed determined from the pressure location input received.

The vibrato control module 938, in some cases, may be configured to process received input (e.g., touch input) associated with request to provide a vibrato simulation. For example, a request to provide a vibrato simulation may be received utilizing a string location of the virtual instrument and/or a vibrato control interface element (e.g., the vibrato control interface elements 222, 714 and 818 of FIGS. 2, 7, and 8, respectively). Upon receiving input, the vibrato control module 938 may be configured to determine a speed and/or volume at which to oscillate between a pitch of an originally sounded note, to a slightly higher pitched note, in order to provide a vibrato simulation. By way of example, a touch pressure (e.g., at a vibrato control interface element or at a note selection location such as a string location) or an indicated location within a vibrato control interface element may be determined from the received input. Based on the touch pressure or the indicated location, the vibrato control module 938 may be configured to determine a corresponding speed and/or volume. In some examples, the speed and/or volume may be determined utilizing a mapping of a pressure/string location input to a corresponding speed and/or volume.

In at least one example, the vibrato control module 938 may be configured to modify the pitch of audio output currently being provided. For example, the pitch of the audio output may be modified to oscillate between two pitches of a note in accordance with the speed and/or volume determined from the input.

In at least one embodiment, the vibrato control module 938 may be configured to set a default of simulated vibrato based on the input received. By way of example, the input may include a default value associated with a selected location within a vibrato control interface element. Upon receipt, the vibrato control module 938 may be configured to set a default vibrato amount corresponding to a default speed and/or volume. Upon receiving, subsequent note selections, the vibrato control module 938 may be configured to modify audio output to include an amount of simulated vibrato corresponding to the default speed and/or volume. In some examples, the vibrato control module 938 may receive additional input indicating a change to the requested vibrato amount and may modify the audio output accordingly. By way of example, the input may indicate that no vibrato is desired. Accordingly, the vibrato control module 938 may cause the audio output to revert to providing audio output corresponding to the selected note without any simulated vibrato applied. As another example, input may be received that indicates that no additional vibrato is desired, but a default vibrato amount may still be known. Accordingly, the vibrato control module 938 may be configured to revert to providing audio output corresponding to the selected note with the default amount of simulated vibrato applied.

The trill control module 940, in some cases, may be configured to process received input (e.g., touch input) associated with a request to provide a trill simulation (e.g., a series of two or more notes). For example, a request to provide a trill simulation may be received utilizing a trill control interface element (e.g., the trill control interface elements 226 and 710 of FIGS. 2 and 7, respectively). Upon receiving input, the trill control module 940 may be configured to determine a pattern corresponding to audio output. In this case, the pattern may indicate that the trill simulation should produce an oscillation between two notes, where one of the notes corresponds to the selected note and the other note corresponds to a different note. In some examples, the pattern may include an indication of a frequency difference between the selected note and a trill note to be used in the trill simulation (e.g., a half step difference, a whole step difference, etc.).

A speed at which to provide a trill simulation may also be determined from the received input. By way of example, a touch pressure a trill control interface element may be included in the received input. The trill control module 940 may be configured to determine a corresponding speed based on the received touch pressure. In some examples, the speed may be determined utilizing a mapping of a pressure value to a corresponding speed. In at least one example, the trill control module 940 may utilize a predetermined speed (e.g., a default trill speed). Once a speed is determined, the trill control module 940 may be configured to cause a trill simulation to be provided utilizing an audio sample corresponding to the selected note. Audio output may be provided by the trill control module 920 to include a trill simulation in accordance with the determined pattern and speed. The trill control module 940 may be configured to receive subsequent input updates indicating a change in trill speed or note selection and may provide audio output corresponding to these changes accordingly.

The grace-note control module 942, in some cases, may be configured to process received input (e.g., touch input) associated with a request to provide a grace-note simulation (e.g., a note immediately preceding a selected note). For example, a request to provide a grace-note simulation may be received utilizing a grace-note control interface element (e.g., the grace-note control interface elements 228 and 708 of FIGS. 2 and 7, respectively). Upon receiving input, the grace-note control module 942 may be configured to determine a pattern corresponding to audio output. In this case, the pattern may indicate that the grace-note simulation should produce a single grace note immediately preceding the selected note and a speed at which the change between the grace note and the selected note is performed. In some examples, the pattern may include an indication of a frequency difference between the selected note and a grace note to be used in the grace-note simulation (e.g., a half step difference, a whole step difference, etc.). The grace-note control module 942 may be configured to cause the grace-note simulation to be provided utilizing an audio sample corresponding to the selected note and an audio sample corresponding to the determined grace note. Thus, audio output may be provided by the grace-note control module 942 to include a grace-note simulation in accordance with the determined pattern and speed. It should be appreciated that the grace-note control module 942 may similarly process and provide mordents according to request to provide a mordent simulation.

The horse-effect control module 944, in some cases, may be configured to process received input (e.g., touch input) associated with a request to provide a horse-effect simulation. For example, a request to provide a horse-effect simulation may be received utilizing a horse-effect selection interface element (e.g., the horse-effect selection interface elements 224 and 712 of FIGS. 2 and 7, respectively). Upon receiving input, the horse-effect control module 944 may be configured to determine a pattern corresponding to audio output. In this case, the pattern may indicate a series of two or more notes (e.g., simulating a horse whinny) to be provided at a particular speed and in a particular order. The horse-effect control module 944 may be configured to cause the horse-effect simulation to be provided utilizing an audio sample corresponding to the selected note and the determined pattern. In another example, the horse-effect control module 944 may be configured to select one of a set of prerecorded horse-effect audio samples in response to receiving a request to provide a horse-effect simulation. The prerecorded horse-effect audio sample may be selected randomly, or it may be selected based on a designated order. For example, the first time a request to provide a horse-effect simulation is received, a first horse-effect audio sample may be utilized to provide audio output. A second time a request to provide a horse-effect simulation is received, a second horse-effect audio sample may be utilized to provide audio output. For subsequent horse-effect requests, the first horse-effect audio sample may be utilized or a different horse-effect audio sample from the set may be utilized.

While examples herein may be described with reference to the computing device 902 being a mobile phone, it should be understood that any type of computing device may be used to perform the functions/embodiments described, as appropriate. For example, the computing device 902 may be a smart watch, a wireless headset or earpiece, or other computing device with a touch screen or input device. In some instances, the computing device 902 may also be equipped a microphone and speaker(s). As such, the computing device 902 (as described above) may be configured for answering incoming phone calls on behalf of a user device (e.g., a mobile phone) and/or the speaker(s) can be used to play audio output.

Additionally, while many embodiments are described herein with reference to stringed instruments such as guitars, pipas, and erhus, the features described herein can be used to implement any virtual instrument imaginable. For example, the concepts of described herein, including the use of simulated lunzhi picking, vibratos simulations, grace-note simulations, trill simulations, and horse-effect simulations, can be utilized with any virtual instrument.

Figure 10:
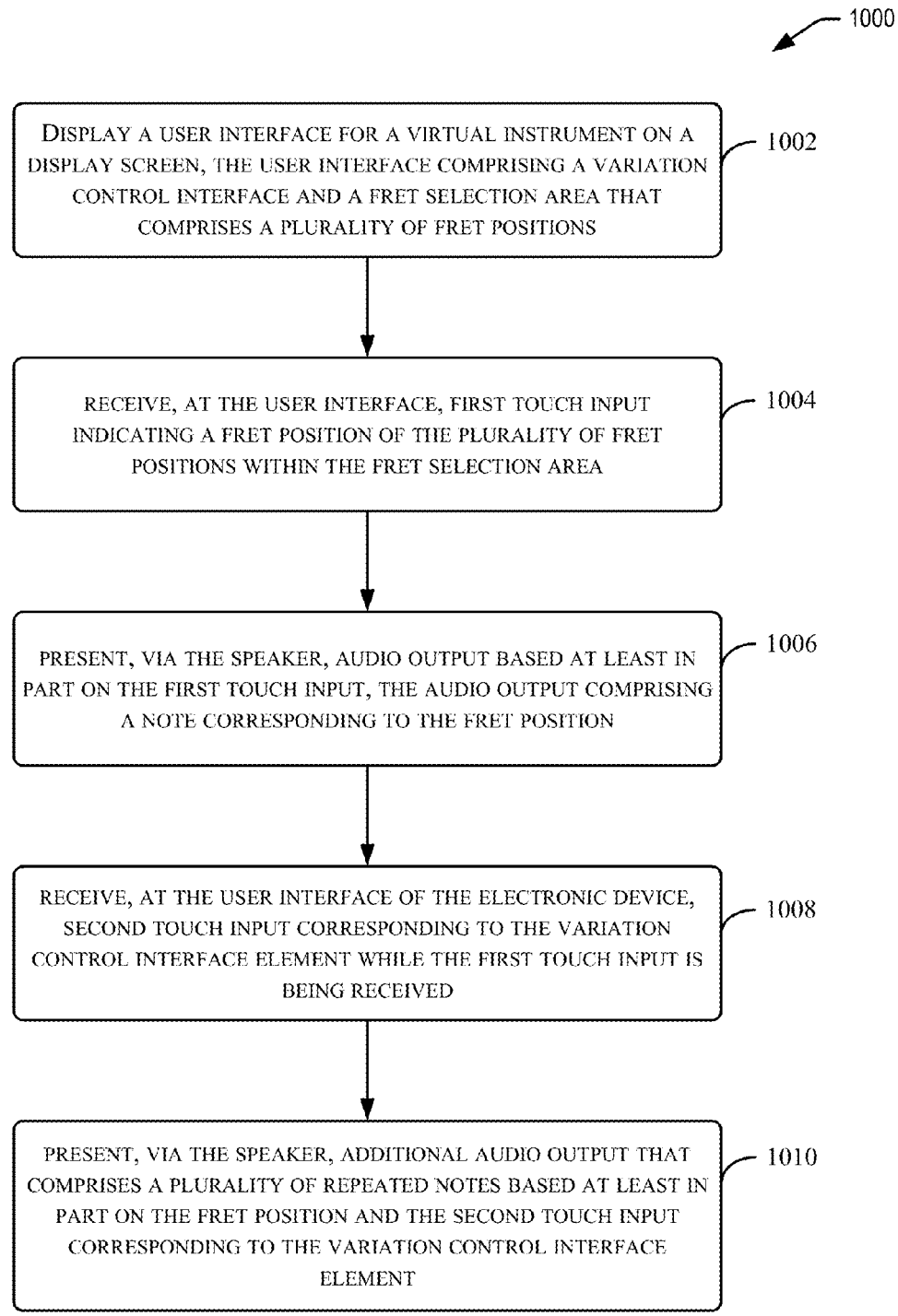
FIG. 10 is a simplified flow diagram illustrating an example process for implementing a user interface including one or more user interface elements for a virtual instrument as described herein, according to at least one example.
Figure 11:
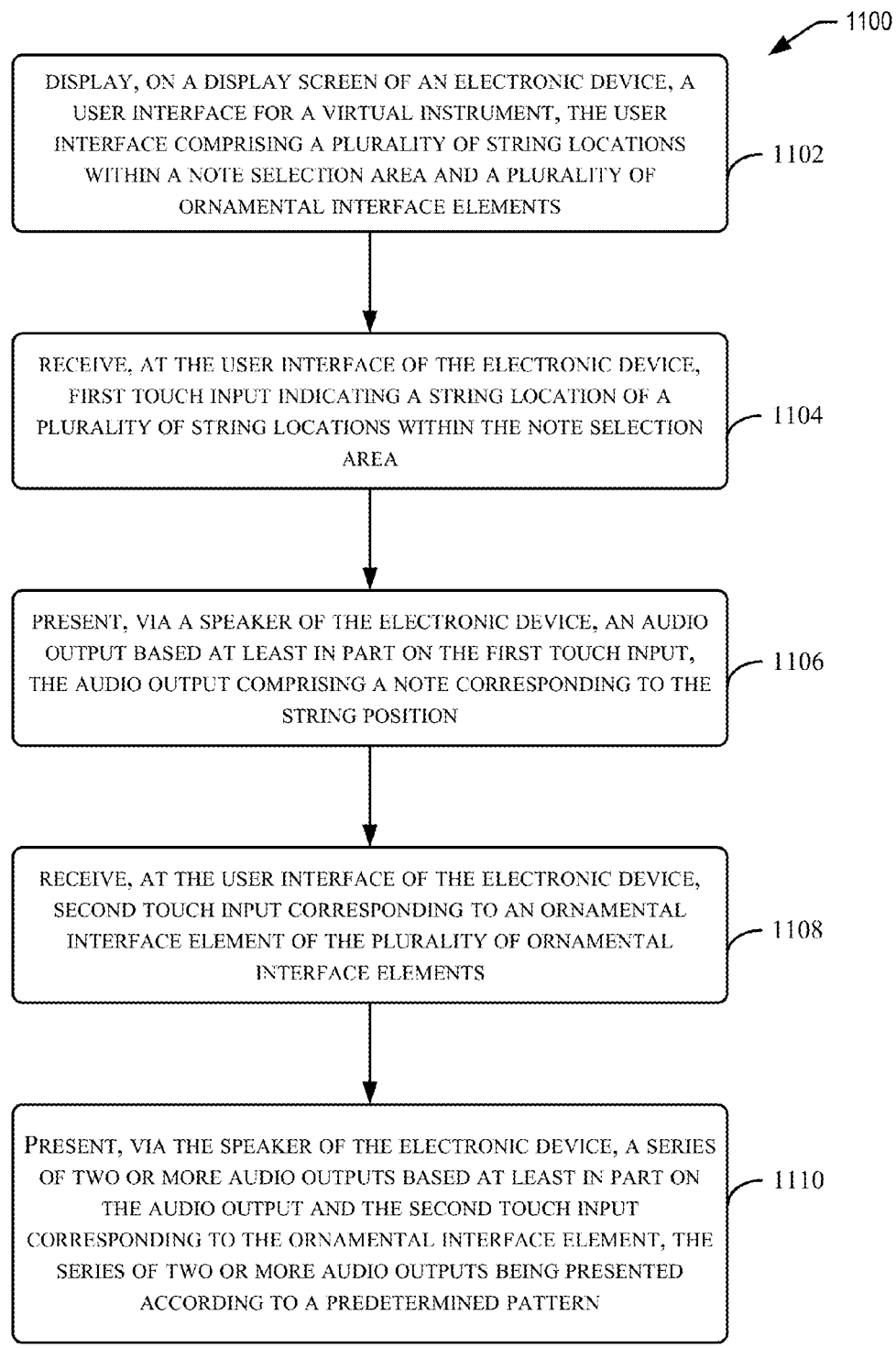
FIG. 11 is another simplified flow diagram illustrating another example process for implementing a user interface including one or more user interface elements for a virtual instrument as described herein, according to at least one example.

FIGS. 10 and 11 illustrate example flow diagrams showing respective processes 1000 and 1100 for implementing a user interface and one or more user interface elements for a virtual instrument, as described herein. These processes 1000 and 1100 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, the process 1000 may be performed by the computing device 902 of FIG. 9 (e.g., utilizing at least the user interface module 934 and the variation control module 936 shown in FIG. 9. In some examples, the computing device 902 may comprise a memory configured to store computer-executable instructions, a speaker, and a processor in communication with the memory and the speaker, the processor configured to execute the computer-executable instructions. The process 1000 may begin at 1002 where a user interface for a virtual instrument (e.g., a pipa) is displayed on a display screen of computing device 902 (e.g., by the user interface module 934). In some example, the user interface may comprise a variation control interface element and a fret selection area that comprises a plurality of fret positions. The virtual instrument, in this example, may be related to a physical pipa instrument and the user interface may be utilized to enable audio output that simulates the playing of a pipa.

At 1004, first touch input may be received at the user interface, indicating a fret position of the plurality of fret positions within the fret selection area. The first touch input may be received by the user interface module 934. In at least one embodiment, the fret position may correspond to a particular note frequency of a plurality of note frequencies that are playable by the virtual instrument. In some embodiments, the fret position may correspond to a note of an associated musical scale. The musical scale may be associated by default or user selection (e.g., based on previous touch input received at a selection interface accessible from the user interface). It should be appreciated that the first touch input may further comprise additional fret positions provided at the user interface using one or more strings and/or a strum area of the user interface. The use of a single fret position is meant to be illustrative in nature and is not intended to limit the scope of the claims.

At 1006, audio output may be presented (e.g., by the user interface module 934) via a speaker (e.g., a speaker of the computing device 902) based at least in part on the first touch input. In at least one example, the audio output may comprise a note corresponding to the fret position. According to some embodiments, the audio output may be selected (by the user interface module 934 based at least in part on the fret position) from a plurality of stored audio samples corresponding to a plurality of musical notes that are playable by the virtual instrument. Such audio samples may be prerecorded and may individually present a sound as played on a physical instrument associated with the virtual instrument.

At 1008, second touch input may be received (e.g., by the variation control module 936 of FIG. 9) at the user interface of the electronic device (e.g., the computing device 902). The second touch input may correspond to any one of the variation control interface elements discussed above. In some examples, the second touch input may be received while the first touch input is being received. In at least one example, the second touch input may correspond to a location within the variation control interface. Receiving the second touch input may cause the location to be associated with a default speed at which repeated notes are to be presented on a speaker of the electronic device. In some embodiments, audio output presented according to subsequent touch inputs may be based at least in part on the default speed and/or the location provided in the subsequent touch input.

At 1010, additional audio output may be presented (e.g., by the variation control module 936) via the speaker of the electronic device (e.g., the computing device 902). The additional audio output may comprise a plurality of repeated notes (e.g., a lunzhi picking simulation) based at least in part on the fret position and the second touch input corresponding to the variation control interface element. By way of example, a frequency of the plurality of repeated notes may be selected based at least in part on the fret position and a speed at which the plurality of repeated notes is presented may be based at least in part on the second touch input corresponding to the variation control interface element. By utilizing the process 1000, a user interface for presenting a lunzhi picking simulation with audio output is provided.

In some examples, the process 1100 may be performed by the computing device 902 of FIG. 9 (e.g., utilizing at least the user interface module 934 and any suitable combination of the vibrato control module 938, the trill control module 940, the grace-note control module 942 and/or the horse-effect control module 944 shown in FIG. 9. The process 1100 may begin at 1102 where a user interface (e.g., an erhu) is displayed (e.g., by the user interface module 934) on a display screen of an electronic device (e.g., the computing device 902). In some example, the user interface may comprise a plurality of string locations within a note selection area and a plurality of ornamental interface elements. In at least one embodiment, the plurality of ornamental interface elements may comprise any suitable combination of a vibrato control interface element, a grace-note control interface element, a trill control interface element, and/or a horse-effect selection interface element as discussed above.

At 1104, first touch input may be received at the user interface of the electronic device, indicating a string location of a plurality of string locations within the note selection area. The first touch input may be received by the user interface module 934. In at least one embodiment, the string location may correspond to a particular note frequency of a plurality of note frequencies that are playable by the virtual instrument. In some embodiments, the string location may correspond to a note of an associated musical scale. The musical scale may be associated by default or user selection (e.g., based on previous touch input received at a selection interface accessible from the user interface).

At 1106, audio output may be presented (e.g., by the user interface module 934) via a speaker of the based at least in part on the first touch input. In at least one example, the audio output may comprise a note corresponding to the string location. According to some embodiments, the audio output may be selected (by the user interface module 934 based at least in part on the string location) from a plurality of stored audio samples corresponding to a plurality of musical notes that are playable by the virtual instrument. Such audio samples may be prerecorded and may individually present a sound as played on a physical instrument associated with the virtual instrument.

At 1108, second touch input may be received at the user interface of the electronic device (e.g., the computing device 902). The second touch input may correspond to an ornamental interface element (e.g., a vibrato control interface element, a trill control interface element, a grace-note control interface element, or a horse-effect selection interface element) of the plurality of ornamental interface elements. In some examples, the second touch input may be received while the first touch input is being received.

At 1110, a series of two or more audio outputs may be presented via the speaker of the electronic device (e.g., the computing device 902). The series of two or more audio outputs may be presented based at least in part on the audio output and the second touch input corresponding to the ornamental interface element. In some examples, the series of two or more audio outputs may be presented according to a predetermined pattern (e.g., a vibrato pattern, a trill pattern, a grace-note pattern, or a horse-effect pattern). By way of example, the series of two or more audio outputs may comprise two or more notes that vary by pitch that, together, provide a vibrato simulation, a trill simulation, a grace-note simulation or a horse-effect simulation. The type of simulation provided may depend on the particular ornamental interface element utilized to provide the second touch input.

Figure 12:
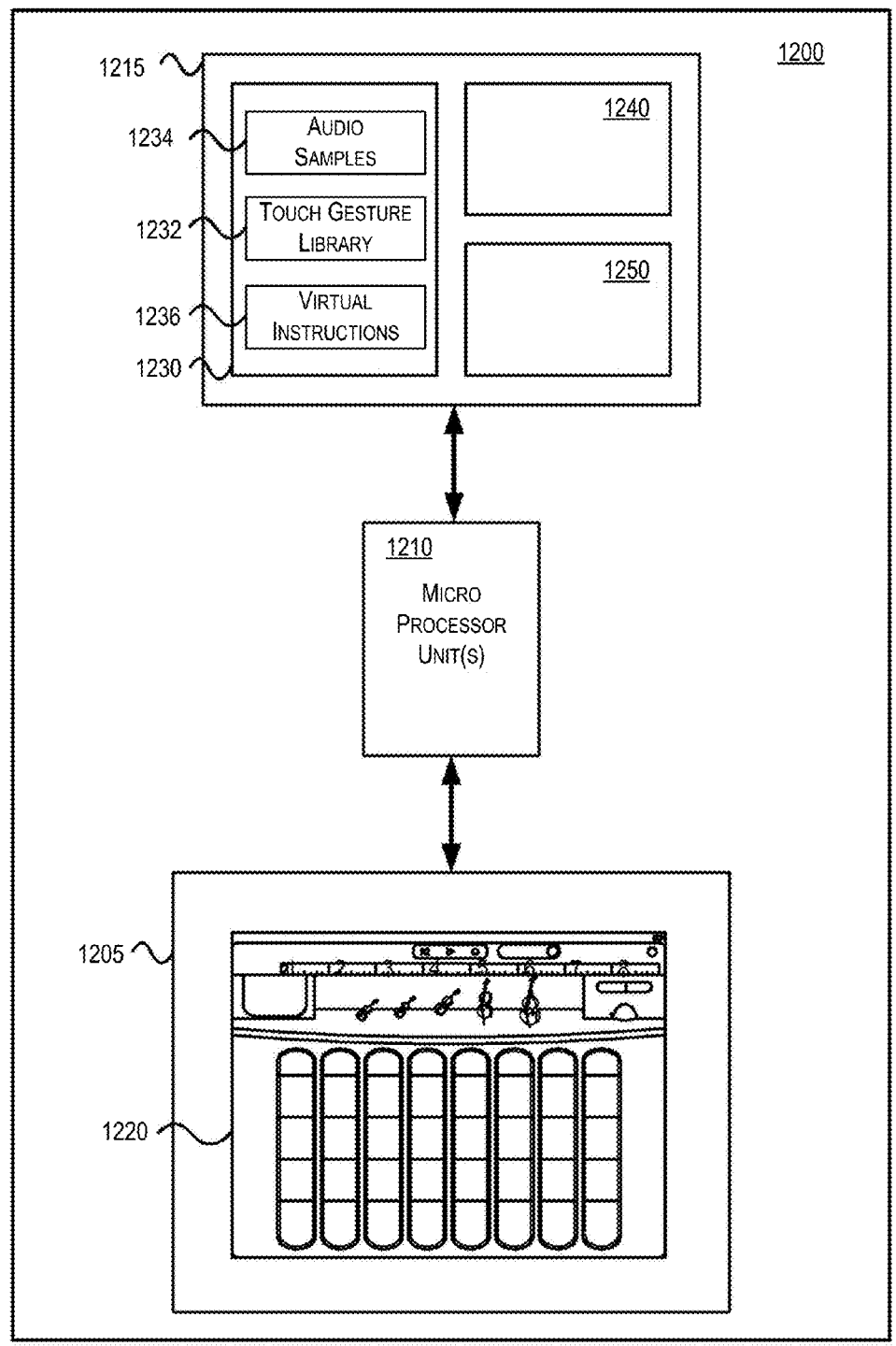
FIG. 12 is a simplified block diagram illustrating an example of a musical performance system that can enable a user to compose and create music with a number of virtual instruments on a music application as described herein, according to at least one example.

FIG. 12 illustrates an example of a musical performance system that can enable a user to compose and create music with a number of virtual instruments on a music application, according to an embodiment of the disclosure. Musical performance system 1200 can include multiple subsystems such as a display 1205, one or more processing units 1210, and a storage subsystem 1215. One or more communication paths can be provided to enable one or more of the subsystems to communicate with and exchange data with one another. The various subsystems in FIG. 12 can be implemented in software, in hardware, or combinations thereof. In some embodiments, the software can be stored on a transitory or non-transitory computer readable storage medium and can be executed by one or more processing units.

It should be appreciated that musical performance system 1200 as shown in FIG. 12 can include more or fewer components than those shown in FIG. 12, can combine two or more components, or can have a different configuration or arrangement of components. In some embodiments, musical performance system 1200 can be a part of a portable computing device, such as a tablet computer, a mobile telephone, a smart phone, a desktop computer, a laptop computer, a kiosk, etc.

Display 1205 in some embodiments can provide an interface that allows a user to interact with musical performance system 1200. Display 1205 can be a monitor or a screen in some embodiments. Through the interface, the user can view and interact with a GUI 1220 of a musical performance system 1200. In some embodiments, display 1205 can include a touch-sensitive interface (also sometimes referred to as a touch screen) that can both display information to the user and receive touch inputs from the user. Processing unit(s) 1210 can include one or more processors that each have one or more cores. In some embodiments, processing unites) 1210 can execute instructions stored in storage subsystem 1215. System 1200 may also include other types of user input and output mechanisms such as allowing a user to provide an input based on received accelerometer or gyroscope sensor readings (internal to system 1200) or provide output such as haptic output based on a desired musical characteristic.

Storage subsystem 1215 can include various memory units such as a system memory 1230, a read-only memory (ROM) 1240, and a permanent storage device 1250. The system memory can be a read-and-write memory device or a volatile read-and-write memory, such as dynamic random access memory. The system memory can store some or all of the instructions and data that the processor needs at runtime. The ROM can store static data and instructions that are needed by processing unites) 1210 and other modules of system 1200. The permanent storage device can be a read-and-write memory device. Some embodiments of the disclosure can use a mass-storage device (such as a magnetic or optical disk or flash memory) as a permanent storage device. Other embodiments can use a removable storage device (e.g., a floppy disk, a flash drive) as a permanent storage device.

Storage subsystem 1215 can store a touch gesture library that includes a number of system recognizable touch gestures 1232 on the GUI 1420, MIDI-controlled audio samples 1234 for storing data relating to music played on the virtual instruments, and virtual instrument data 1236 for storing information about each virtual instrument. Further detail regarding system architecture and auxiliary components thereof are not discussed in detail so as not to obfuscate the focus on the disclosure and would be understood by those of ordinary skill in the art.

What is claimed is:

1. A method, comprising:
    obtaining a plurality of audio samples corresponding to recordings of musical notes played by a physical instrument;
    displaying, on a display screen of an electronic device, a user interface for a virtual instrument associated with the physical instrument, the user interface comprising a strum area, a variation control interface element, and a fret selection area that comprises a plurality of fret positions;
    receiving, at the user interface of the electronic device, first touch input indicating a fret position of a plurality of fret positions within the fret selection area;
    presenting, via a speaker of the electronic device, an audio sample of the plurality of audio samples based at least in part on the first touch input, the audio sample comprising a note corresponding to the fret position;
    receiving, at the user interface, second touch input corresponding to a location within the variation control interface element, the second touch input being received while the first touch input is being received;
    determining a speed at which to play the audio sample repeatedly based at least in part on the second touch input; and
    repeatedly presenting, via the speaker of the electronic device, the audio sample based at least in part on the determined speed.

2. The method of claim 1, wherein the physical instrument comprises a pipa and the virtual instrument simulates a pipa.

3. The method of claim 1, wherein receiving the second touch input corresponding to the location within the variation control interface element causes the location to be associated with a default speed at which repeated notes are to be played.

4. The method of claim 3, further comprising:
    receiving, at the user interface, a third touch input indicating a selection of an additional note selection option;
    determining an additional audio sample of the plurality of audio samples based at least in part on the third touch input indicating the selection of the additional note selection option; and
    repeatedly playing the additional audio sample based at least in part on the default speed.

5. The method of claim 3, further comprising:
    receiving, at the user interface, one or more updates that a selected location within the variation control interface element has changed, the selected location being associated with a particular speed at which the audio sample is to be repeated; and
    repeatedly presenting the audio sample according to the particular speed.

6. The method of claim 1, further comprising:
    receiving, at the user interface, third touch input corresponding to the strum area; and
    presenting a plurality of audio samples based at least in part on the fret position, the second touch input corresponding to the variation control interface element, and the third touch input corresponding to the strum area.

7. The method of claim 6, wherein providing the plurality of audio samples further comprises:
    determining a subset of the plurality of audio samples based at least in part on the first touch input indicating the fret position and third touch input corresponding to the strum area;
    presenting, via the speaker of the electronic device, the audio sample with the subset of the plurality of audio samples according to the third touch input; and
    determining the first touch input indicating that the fret position is maintained, wherein the audio sample is repeatedly presented based at least in part on the determined speed in response to determining that the first touch input is maintained.

8. The method of claim 6, wherein at least two of the first touch input, the second touch input, or the third touch input are received at substantially a same time.

9. A system, comprising:
    a memory configured to store computer-executable instructions;
    a display screen;
    a speaker; and
    a processor in communication with the memory and the speaker, the processor configured to execute the computer-executable instructions to at least:

display, on the display screen, a user interface for a virtual instrument, the user interface comprising a variation control interface element and a fret selection area that comprises a plurality of fret positions;

receive, at the user interface, first touch input indicating a fret position of the plurality of fret positions within the fret selection area;

present, via the speaker, audio output based at least in part on the first touch input, the audio output comprising a note corresponding to the fret position;

receive, at the user interface, second touch input corresponding to the variation control interface element while the first touch input is being received; and present, via the speaker, additional audio output that comprises a plurality of repeated notes based at least in part on the fret position and the second touch input corresponding to the variation control interface element.

10. The system of claim 9, wherein the fret position corresponds to a particular note frequency of a plurality of note frequencies that are playable by the virtual instrument.

11. The system of claim 9, wherein the processor is further configured to execute the computer-executable instructions to at least:

receive additional touch input at the variation control interface element corresponding to an amount of pressure applied to a touch interface associated with the variation control interface element; and modify a speed at which the plurality of repeated notes is presented according to the additional touch input, wherein the speed at which the plurality of repeated notes are played increases as the amount of pressure applied to the touch interface is increased.

12. The system of claim 9, wherein the processor is further configured to execute the computer-executable instructions to at least:

present a selection interface accessible from the user interface, the selection interface providing one or more options corresponding to one or more musical scale modes, the one or more musical scale modes corresponding to different sets of musical notes that are playable by the virtual instrument;

receive, at the selection interface, an indication that a particular musical scale mode of the one or more musical scale modes is selected; and associate the plurality of fret positions to a corresponding set of musical notes based at least in part on the musical scale mode selected.

13. The system of claim 9, wherein the processor is further configured to execute the computer-executable instructions to at least:

receive, at the user interface, third touch input associated with the fret selection area, the third touch input indicating a pitch bend request; and modify the audio output based at least in part on the third touch input, the modification causing an increase in pitch of the audio output.

14. A computer-readable storage medium having stored thereon computer-executable instructions that, when executed by a processor, cause the processor to perform operations comprising:

displaying, on a display screen of an electronic device, a user interface for a virtual instrument associated with a physical instrument, the user interface comprising a plurality of note selection areas and a variation control interface element, the plurality of note selection areas being grouped into sets of note selection areas associated with a corresponding musical scale;

receiving, at the user interface, a first touch input indicating selection of a note selection area of a set of note selection areas corresponding to a particular musical scale;

determining an audio sample of a plurality of audio samples based at least in part on the first touch input indicating selection of the note selection area;

presenting, via a speaker of the electronic device, audio output corresponding to the audio sample;

receiving, at the user interface, a second touch input corresponding to a location within the variation control interface element;

determining a speed at which to present additional audio output based at least in part on the second touch input; and presenting, via the speaker, the additional audio output that comprises a plurality of repeated notes based at least in part on the note selection area and the determined speed.

15. The computer-readable storage medium of claim 14, wherein the physical instrument comprises a pipa and the virtual instrument simulates a pipa.

16. The computer-readable storage medium of claim 14, having stored thereon additional computer-executable instructions that, when executed by a processor, cause the processor to perform operations comprising:

receiving a pitch bend request related to the note selection area, the pitch bend request comprising accelerometer data indicating a tilt angle of a device that is displaying the user interface;

modifying the audio output according to the tilt angle of the device; and presenting, via the speaker, the modified audio output.

17. The computer-readable storage medium of claim 14, having stored thereon additional computer-executable instructions that, when executed by a processor, cause the processor to perform operations comprising:

determining that contact with the display screen at a display location corresponding to the first touch input has been maintained; and presenting the audio output continuously based at least in part on the contact being maintained.

18. The computer-readable storage medium of claim 14, wherein repeatedly playing the audio output simulates a lunzhi picking technique.

19. The computer-readable storage medium of claim 14, wherein presenting the audio output comprising the plurality of repeated notes further comprises generating one or more modified audio outputs that vary in pitch or volume, wherein the one or more modified audio outputs are utilized with the audio output to simulate a lunzhi picking technique.

20. The computer-readable storage medium of claim 14, having stored thereon additional computer-executable instructions that, when executed by a processor, cause the processor to perform operations comprising:

displaying, on the display screen, a selection interface accessible from the user interface, the selection interface providing one or more options corresponding to plurality of auto-play options, the plurality of auto-play options corresponding to a plurality of dynamic musical arrangements, the dynamic musical arrangements differing from one another in at least a degree of complexity;

receiving an indication that a particular auto-play option is selected; and presenting, on the speaker, a dynamic musical arrangement based at least in part on the auto-play option and the first touch input.

21. A method, comprising:
displaying, on a display screen of an electronic device, a user interface for a virtual instrument, the user interface comprising a plurality of string locations within a note selection area and a plurality of ornamental interface elements;
receiving, at the user interface of the electronic device, first touch input indicating a string location of a plurality of string locations within the note selection area;
presenting, on a speaker of the electronic device, audio output based at least in part on the first touch input, the audio output comprising a note corresponding to the string location;
receiving, at the user interface of the electronic device, second touch input corresponding to an ornamental interface element of the plurality of ornamental interface elements; and
presenting, on the speaker of the electronic device, a series of two or more audio outputs based at least in part on the audio output and the second touch input corresponding to the ornamental interface element, the series of two or more audio outputs being presented according to a predetermined pattern.

22. The method of claim 21, further comprising:
receiving, at the user interface of the electronic device, third touch input indicating a change of pressure that is being applied to a touch interface of the electronic device at the ornamental interface element; and
modifying a speed at which the series of the two or more audio outputs of the plurality of audio samples are presented based at least in part on the change of pressure.

23. The method of claim 22, wherein the speed is increased as the pressure is increased, and wherein the speed is decreased as the pressure is decreased.

24. The method of claim 23, wherein the two or more audio outputs comprise a first audio output associated with a first note and a second audio output associated with a second note, and where the first audio output and the second audio output differ at least by an intervallic distance between the first note and the second note.

25. The method of claim 24, wherein the intervallic distance comprises a whole step of a twelve-tone musical scale associated with the string location.

26. The method of claim 21, further comprising:
generating at least one audio output of the two or more audio outputs based at least in part on the note corresponding to the string location.

27. The method of claim 21, wherein the ornamental interface element comprises a grace-note control interface element, a trill control interface element, a vibrato control interface element, or a horse-effect selection interface element.

28. The method of claim 27, wherein the predetermined pattern comprises a first pattern when second touch input is received at the grace-note control interface element, a second pattern when the second touch input is received at the trill control interface element, a third pattern when the second touch input is received at the vibrato control interface element, and a fourth pattern when the second touch input is received at the horse-effect selection interface element.

29. A system, comprising:
a memory configured to store computer-executable instructions;
a display screen,
a speaker; and
a processor in communication with the memory and the speaker, the processor configured to execute the computer-executable instructions to at least:
displaying, on the display screen, a user interface for a virtual instrument, the user interface comprising a plurality of string locations within a note selection area and a plurality of ornamental interface elements comprising at least a vibrato control interface element;
receive, at the user interface, first touch input indicating a string location of the plurality of string locations within a note selection area;
present, via the speaker, audio output based at least in part on the first touch input, the audio output comprising a note corresponding to the string location;
receive, at the user interface, second touch input corresponding to selection of the vibrato control interface element;
modify the audio output based at least in part on the second touch input corresponding to the vibrato control interface element, the modified audio output and the audio output differing at least by pitch; and
present, via the speaker, the audio output and the modified audio output.

30. The system of claim 29, wherein the second touch input is received at the vibrato control interface element.

31. The system of claim 29, wherein the second touch input is initiated by a change in pressure applied to a touch interface of the display at the string location.

32. The system of claim 29, wherein the second touch input comprises a default vibrato control, and wherein subsequent presentation of audio output is based at least in part on subsequent string locations selections and the default vibrato control.

33. The system of claim 29, wherein the second touch input comprises a selection location within the vibrato control interface element, and wherein the audio output is modified further based at least in part on the selection location.

34. A computer-readable storage medium having stored thereon computer-executable instructions that, when executed by a processor, cause the processor to perform operations comprising:
obtaining a plurality of audio samples corresponding to recordings of musical notes played by a physical instrument;
displaying, on a display screen of an electronic device, a user interface for a virtual instrument associated with the physical instrument, the user interface comprising a plurality of note selection areas and vibrato control interface element, the plurality of note selection areas being grouped into sets of note selection areas individually associated with a corresponding musical scale;
receiving, at the user interface, a first touch input indicating selection of a note selection area of a set of note selection areas associated with a particular musical scale;
determining an audio output from the plurality of audio samples based at least in part on the first touch input indicating selection of the note selection area;
presenting, via a speaker of the electronic device, the audio output according to the first touch input;

receiving, at the user interface, a second touch input corresponding to the vibrato control interface element;

modifying a pitch of the audio output based at least in part on the second touch input corresponding to the vibrato control interface element.

35. The computer-readable storage medium of claim 34, wherein the second touch input comprises at least one of a location selection within the vibrato control interface element or a pressure applied to a touch interface corresponding to the vibrato control interface element.

36. The computer-readable storage medium of claim 34, having stored thereon additional computer-executable instructions that, when executed by a processor, cause the processor to perform operations comprising:

determining that the first touch input is being maintained; and presenting the audio output continuously for as long as the first touch input is maintained.

37. The computer-readable storage medium of claim 34, wherein modifying the pitch comprises:

determining a plurality of frequencies that are within a threshold frequency distance of a musical note corresponding to the audio output; and modifying the frequency of the audio output to the plurality of frequencies according to the second touch input.

38. The computer-readable storage medium of claim 37, wherein a speed at which the frequency of the audio output is modified is determined based at least in part on the second touch input.

39. The computer-readable storage medium of claim 34, wherein the physical instrument is an erhu and the virtual instrument simulates an erhu.

40. The computer-readable storage medium of claim 34, having stored thereon additional computer-executable instructions that, when executed by a processor, cause the processor to perform operations comprising:

displaying, on the display screen, a selection interface accessible from the user interface, the selection interface providing one or more options corresponding to plurality of auto-play options, the plurality of auto-play options corresponding to a plurality of dynamic musical arrangements, the dynamic musical arrangements differing from one another in at least a degree of complexity;

receiving an indication that a particular auto-play option is selected; and presenting, via the speaker, a dynamic musical arrangement corresponding to the auto-play option selected.

* * * * *